United States Patent
Bae et al.

(10) Patent No.: US 12,027,731 B2
(45) Date of Patent: Jul. 2, 2024

(54) PHOSPHATE ANION-QUATERNARY AMMONIUM ION PAIR COORDINATED POLYMER MEMBRANES

(71) Applicant: Rensselaer Polytechnic Institute, Troy, NY (US)

(72) Inventors: Chulsung Bae, Cohoes, NY (US); Ding Tian, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 17/309,401

(22) PCT Filed: Nov. 26, 2019

(86) PCT No.: PCT/US2019/063173
§ 371 (c)(1),
(2) Date: May 25, 2021

(87) PCT Pub. No.: WO2020/112721
PCT Pub. Date: Jun. 4, 2020

(65) Prior Publication Data
US 2022/0052357 A1    Feb. 17, 2022

Related U.S. Application Data

(60) Provisional application No. 62/940,084, filed on Nov. 25, 2019, provisional application No. 62/771,372, filed on Nov. 26, 2018.

(51) Int. Cl.
*H01M 8/0289* (2016.01)
*C08J 5/22* (2006.01)

(52) U.S. Cl.
CPC ......... *H01M 8/0289* (2013.01); *C08J 5/2281* (2013.01); *C08J 5/2293* (2013.01);
(Continued)

(58) Field of Classification Search
CPC ......... H01M 8/0289; H01M 2300/0085; C08J 5/2281; C08J 5/2293; C08J 2300/106; C08J 2423/04
See application file for complete search history.

(56) References Cited

U.S. PATENT DOCUMENTS

| | | | |
|---|---|---|---|
| 6,590,067 B2 | 7/2003 | Kerres et al. | |
| 7,078,121 B2 | 7/2006 | Kanaoka et al. | |

(Continued)

FOREIGN PATENT DOCUMENTS

| | | |
|---|---|---|
| CA | 2396166 A1 | 1/2003 |
| CN | 1312833 A | 9/2001 |

(Continued)

OTHER PUBLICATIONS

CN103694490 MT (Year: 2014).*

(Continued)

*Primary Examiner* — Alexander Usyatinsky
(74) *Attorney, Agent, or Firm* — Weaver Austin Villeneuve & Sampson LLP

(57) ABSTRACT

Ion exchange membranes materials according to the present disclosure exhibit improved conductivity at low and intermediate relative humidity without sacrificing mechanical strength. Polymers are provided that include a backbone with one or more aryl groups, a halocarbyl group, and a halocarbyl side chain attached to the backbone, wherein the halocarbyl side chain includes a halide separated from the backbone by a hydrocarbyl chain, a hydrocarbyl ring, or combinations thereof. The halide is substituted with a tertiary amine and halide anions are then exchanged with hydroxide anions. The polymers are then contacted with phosphoric acid, which is deprotonated by the hydroxide ions, forming anions which enhance interactions with adjacent quaternary ammonium groups and induce excess phosphoric acid molecules to cluster around those quaternary (Continued)

ammonium groups. The membranes exhibit negligible dopant leaching even at high relative humidity.

13 Claims, 8 Drawing Sheets

(52) U.S. Cl.
CPC ...... *C08J 2300/106* (2013.01); *C08J 2423/04* (2013.01); *H01M 2300/0085* (2013.01)

(56) References Cited

U.S. PATENT DOCUMENTS

| | | | |
|---|---|---|---|
| 7,615,300 | B2 | 11/2009 | Bae |
| 7,671,157 | B2 | 3/2010 | Bae |
| 7,888,397 | B1 | 2/2011 | Hibbs et al. |
| 8,445,141 | B2 | 5/2013 | Kitamura et al. |
| 8,697,203 | B2 | 4/2014 | Koenig |
| 8,809,483 | B1 | 8/2014 | Hibbs |
| 9,051,431 | B2 | 6/2015 | Kim et al. |
| 9,276,282 | B2 | 3/2016 | Zhang et al. |
| 9,534,097 | B2 | 1/2017 | Hibbs |
| 9,580,541 | B1 | 2/2017 | Fujimoto et al. |
| 9,988,526 | B2 | 6/2018 | Rodrigues et al. |
| 10,053,534 | B2 | 8/2018 | Fujimoto |
| 10,053,535 | B2 | 8/2018 | Kim et al. |
| 10,170,799 | B2 | 1/2019 | Ouchi et al. |
| 10,272,424 | B2 | 4/2019 | Bae et al. |
| 10,290,890 | B2 | 5/2019 | Yan et al. |
| 10,294,325 | B2 | 5/2019 | Fujimoto |
| 10,370,483 | B2 | 8/2019 | Kim et al. |
| 10,435,504 | B2 | 10/2019 | Bae et al. |
| 11,236,196 | B2 | 2/2022 | Bae et al. |
| 11,286,337 | B2 | 3/2022 | Bae et al. |
| 11,621,433 | B2 | 4/2023 | Bae et al. |
| 11,826,746 | B2 | 11/2023 | Bae et al. |
| 11,834,550 | B2 | 12/2023 | Bae et al. |
| 2002/0061431 | A1 | 5/2002 | Koyama et al. |
| 2002/0062046 | A1 | 5/2002 | Swan et al. |
| 2003/0056669 | A1 | 3/2003 | Miller et al. |
| 2003/0114598 | A1 | 6/2003 | Li et al. |
| 2003/0134936 | A1 | 7/2003 | West et al. |
| 2003/0173547 | A1 | 9/2003 | Yamakawa et al. |
| 2004/0048127 | A1* | 3/2004 | Shirai .............. H01B 1/122 429/304 |
| 2006/0004177 | A1 | 1/2006 | Gao et al. |
| 2006/0135702 | A1* | 6/2006 | Wang ............... H01M 8/1081 525/344 |
| 2007/0048579 | A1 | 3/2007 | Bae |
| 2008/0262163 | A1 | 10/2008 | Bae |
| 2009/0004528 | A1 | 1/2009 | Fritsch et al. |
| 2009/0280383 | A1 | 11/2009 | Mackinnon et al. |
| 2010/0041834 | A1 | 2/2010 | Bae |
| 2010/0047657 | A1 | 2/2010 | Mackinnon et al. |
| 2010/0279204 | A1 | 11/2010 | Isomura et al. |
| 2011/0207028 | A1 | 8/2011 | Fukuta et al. |
| 2013/0292252 | A1 | 11/2013 | Linder et al. |
| 2014/0024728 | A1 | 1/2014 | Kim et al. |
| 2014/0227627 | A1 | 8/2014 | He et al. |
| 2014/0275300 | A1 | 9/2014 | Kim et al. |
| 2014/0353241 | A1 | 12/2014 | Yin et al. |
| 2015/0017566 | A1 | 1/2015 | Watanabe et al. |
| 2015/0111128 | A1 | 4/2015 | Matsuda et al. |
| 2017/0114196 | A1* | 4/2017 | Häring .............. C25B 13/08 |
| 2017/0203289 | A1 | 7/2017 | Bae et al. |
| 2017/0252707 | A1 | 9/2017 | Bahar et al. |
| 2017/0355811 | A1* | 12/2017 | Bae .................. C09D 165/00 |
| 2018/0251616 | A1 | 9/2018 | Bahar et al. |
| 2019/0308185 | A1 | 10/2019 | Bae et al. |
| 2020/0055980 | A1 | 2/2020 | Bae et al. |
| 2020/0091535 | A1 | 3/2020 | Bae et al. |
| 2020/0094241 | A1 | 3/2020 | Bae et al. |
| 2020/0172659 | A1 | 6/2020 | Bae et al. |
| 2020/0223997 | A1 | 7/2020 | Bae et al. |
| 2020/0238272 | A1 | 7/2020 | Bae et al. |
| 2021/0108067 | A1 | 4/2021 | Bae et al. |
| 2022/0127412 | A1 | 4/2022 | Bae et al. |
| 2022/0227921 | A1 | 7/2022 | Bae et al. |
| 2022/0266239 | A1 | 8/2022 | Bae et al. |
| 2023/0096778 | A1 | 3/2023 | Bae et al. |

FOREIGN PATENT DOCUMENTS

| | | | |
|---|---|---|---|
| CN | 101578729 | * | 11/2009 |
| CN | 102869448 | A | 1/2013 |
| CN | 103459526 | A | 12/2013 |
| CN | 103694490 | * | 4/2014 |
| CN | 106040318 | A | 10/2016 |
| CN | 106536583 | A | 3/2017 |
| CN | 107112563 | A | 8/2017 |
| CN | 109070022 | A | 12/2018 |
| EP | 2324529 | B1 | 1/2016 |
| JP | H06188005 | A | 7/1994 |
| JP | 2001002738 | A | 1/2001 |
| JP | 2003203648 | A | 7/2003 |
| JP | 2004131662 | A | 4/2004 |
| JP | 2012049111 | A | 3/2012 |
| JP | 2013505825 | A | 2/2013 |
| JP | 2016032098 | A | 3/2016 |
| JP | 2017531700 | A | 10/2017 |
| JP | 2018502180 | A | 1/2018 |
| JP | 2021523978 | A | 9/2021 |
| KR | 20140064308 | A | 5/2014 |
| KR | 20150060159 | A | 6/2015 |
| WO | WO-2006066505 | A1 | 6/2006 |
| WO | WO-2007079004 | A2 | 7/2007 |
| WO | WO-2012081026 | A2 | 6/2012 |
| WO | WO-2016014636 | A1 | 1/2016 |
| WO | WO 2016/081432 | * | 5/2016 |
| WO | WO 2017/172824 | * | 10/2017 |
| WO | WO-2018119020 | A1 | 6/2018 |
| WO | WO-2019010290 | A1 | 1/2019 |
| WO | WO-2019068051 | A2 | 4/2019 |

OTHER PUBLICATIONS

CN 101578729 MT (Year: 2009).*
Adhikari S et al., "Ionomers for Electrochemical Energy Conversion & Storage Technologies," Polymer, 2020, 123080.
Ayers K, "Benchmarking Advanced Water Splitting Technologies: Best Practices in Materials Characterization," presented at the 2020 U.S. Department of Energy Hydrogen and Fuel Cells Program Annual Merit Review and Peer Evaluation Meeting on May 20, 2020, accessible at https://www.hydrogen.energy.gov/pdfs/review20/p170_ayers_2020_o.pdf (last accessed Dec. 15, 2020), 21 pp.
Ayers K, "Economic Production of Hydrogen through the Development of Novel, High Efficiency Electrocatalysts for Alkaline Membrane Electrolysis," presented at the 2017 U.S. Department of Energy (DOE) Hydrogen and Fuel Cells Program and Vehicle Technologies Office Annual Merit Review and Peer Evaluation Meeting on Jun. 5-9, 2017 in Washington, D.C., accessible at https://www.hydrogen.energy.gov/pdfs/review17/pd147_ayers_2017_o.pdf (last accessed Dec. 15, 2020), 29 pp.
Bae C, "Channeling Engineering of Hydroxide Ion Exchange Polymers and Reinforced Membranes," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/arpae09_bae_2019_p.pdf (last accessed Dec. 15, 2020), 26 pp.
Bae C, "Cyclic Olefin Copolymer based Alkaline Exchange Polymers and Reinforced Membranes," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/fc307_bae_2019_p.pdf (last accessed Dec. 15, 2020), 13 pp.
Bae C, "Cyclic Olefin Copolymer based Alkaline Exchange Polymers and Reinforced Membranes," presented at the 2020 U.S. Department of Energy Hydrogen and Fuel Cells Program Annual

(56) References Cited

OTHER PUBLICATIONS

Merit Review and Peer Evaluation Meeting on May 19, 2020, accessible at https://www.hydrogen.energy.gov/pdfs/review20/fc307_bae_2020_o.pdf (last accessed Dec. 15, 2020), 21 pp.

Bae C, "Development of Versatile Polymer Materials for Anion Exchange Membranes in Electrochemical Energy Conversion Technology," ECS Meeting Abstracts, 2020, MA2020-02, 2363 (1 p.).

Bae C et al., "Cyclic Olefin Copolymer-Based Alkaline Exchange Polymers and Reinforced Membranes" in 2019 Annual Progress Report: DOE Hydrogen and Fuel Cells Program, U.S. Department of Energy, Document No. DOE/GO-102020-5257, Apr. 2020, accessible at https://www.hydrogen.energy.gov/pdfs/progress19/fc_fc307_bae_2019.pdf (last accessed Dec. 15, 2020), 5 pp.

Bae C, "Ion Conducting Polymer Electrolyte Membranes for Energy Conversion Technology," presented at the Rensselaer Polytechnic Institute Center for Future Energy Systems (RPI CFES) Symposium on Apr. 10, 2019 in Troy, New York, accessible at https://cfes.rpi.edu/sites/default/files/A7%20Bae.pdf (last accessed Dec. 15, 2020), 19 pp.

Bae C, "New functional polymers for alternative energy applications," presented at University of Nevada, Las Vegas (UNLV) Renewable Energy Symposium on Aug. 20, 2008 in Las Vegas, Nevada, accessible at https://digitalscholarship.unlv.edu/cgi/viewcontent.cgi?article=1023&context=res (last accessed Jan. 16, 2021), 21 pp.

Black SB et al., "FTIR characterization of water-polymer interactions in superacid polymers," The Journal of Physical Chemistry B, 2013, 117 (50), 16266-16274.

BR Office Action dated Dec. 9, 2022 in Application No. BR1120200219266 with English translation.

Briem M et al., "Comparison of Novel 1, 1-Diphenylethylene Alternating Copolymer and Polystyrene Based Anion Exchange Membranes," ECS Meeting Abstracts, 2020, MA2020-2, 2242 with Presentation (31 pp.).

Brownell LV et al., "Synthesis of polar block grafted syndiotactic polystyrenes via a combination of iridium-catalyzed activation of aromatic C—H bonds and atom transfer radical polymerization," Journal of Polymer Science Part A: Polymer Chemistry, 2009, 47(23), 6655-6667.

CA Office Action dated Jul. 29, 2022, in Application No. CA2968110.

Cai, M et al., "Synthesis and Characterization of Poly(ether ketone ether ketone ketone)/Poly(ether ether ketone ketone) Copolymers Containing Naphthalene and Pendant Cyano Groups", Journal of Applied Polymer Science, 2009, vol. 112, pp. 3225-3231.

Chang, J. Y et al., "Synthesis of a Linear Phenolic Polymer by an Aromatic Electrophilic Substitution Reaction", Macromolecules, 1997, vol. 30, pp. 8075-8077.

Chang Y et al., "Acidity Effect on Proton Conductivity of Hydrocarbon-Based Ionomers," ECS Transactions, 2010, 33 (1), 735.

Chang Y et al., "Aromatic ionomers with highly acidic sulfonate groups: acidity, hydration, and proton conductivity," Macromolecules, 2011, 44 (21), 8458-8469.

Chang Y et al., "Scope and regioselectivity of iridium-catalyzed C—H borylation of aromatic main-chain polymers," Macromolecules, 2013, 46 (5), 1754-1764.

Chang Y et al., "Direct Fluorination of the Carbonyl Group of Benzophenones Using Deoxo-Fluor®: Preparation of Bis (4-Fluorophenyl) Difluoromethane," Organic Syntheses, 2010, 87, 245-252.

Chang Y et al., "Direct nucleophilic fluorination of carbonyl groups of benzophenones and benzils with Deoxofluor," Tetrahedron, 2008, 64 (42), 9837-9842.

Chang Y et al., "Effect of superacidic side chain structures on high conductivity aromatic polymer fuel cell membranes," Macromolecules, 2015, 48(19), 7117-7126.

Chang Y et al., "Partially fluorinated sulfonated poly (ether amide) fuel cell membranes: influence of chemical structure on membrane properties," Polymers 3(1), 222-235.

Chang Y et al., "Poly (Arylene Ether Sulfone) Ionomers with Different Acidity Strengths and Fuel Cell Membrane Properties," ECS Transactions, 2013, 50(2), 1031.

Chang Y et al., "Polymer electrolyte membranes based on poly (arylene ether sulfone) with pendant perfluorosulfonic acid," Polymer Chemistry, 2013, 4(2), 272-281.

Chang Y et al., "Polymer-supported acid catalysis in organic synthesis," Current Organic Synthesis, 2011, 8 (2), 208-236.

Chang Y et al., "Polystyrene Ionomers Functionalized with Partially Fluorinated Short Side-Chain Sulfonic Acid for Fuel Cell Membrane Applications," in Sustainable Membrane Technology for Energy, Water, and Environment, Ismail AF & Matsuura T (eds.), John Wiley & Sons, 2012, pp. 243-249.

Chang Y et al., "Polystyrene-Based Superacidic Ionomers: Synthesis and Proton Exchange Membrane Applications," ECS Transactions, 2011, 41 (1), 1615.

Chang Y et al., "Polystyrene-based superacidic solid acid catalyst: synthesis and its application in biodiesel production," RSC advances, 2014, 4 (88), 47448-47454.

Chen, G. et al., "Cationic fluorinated polymer binders for microbial fuel cell cathodes", DOI: 10.1039/C2RA20705B (Paper) RSC Adv, 2012, vol. 2, pp. 5856-5862.

Chung HT et al., "Effect of organic cations on hydrogen oxidation reaction of carbon supported platinum," Journal of The Electrochemical Society, 2016, 163(14), F1503-F1509.

Clendinning, R. A, et al., "Poly(aryl Ether Ketone) Block and Chain-extended Copolymers. 1. Preparation and Characterization of a New Class of Functional Poly(aryl Ether Ketone) Oligomers", Macromolecules, 1993, vol. 26, 2361-2365.

CN Office Action dated Sep. 5, 2022 in Application No. CN202010532979.2 with English translation.

CN Office Action dated Mar. 29, 2023, in Application No. CN202010532979.2 with English translation.

CN Office Action dated Sep. 1, 2022, in Application No. CN201980041740 with English translation.

CN Search Report dated Oct. 29, 2019 in Application No. 201580062578.2.

CN Supplemental Search Report dated Mar. 25, 2020 in Application No. 201580062578.2.

Colquhoun, H. M, et al., "Superelectrophiles in Aromatic Polymer Chemistry", Macromolecules, 2001, vol. 34, pp. 1122-1124.

Cruz, A.R et al., "Precision Synthesis of Narrow Polydispersity, Ultrahigh Molecular Weight Linear Aromatic Polymers by $A_2 + B_2$ Nonstoichiometric Step-Selective Polymerization", Macromolecules, 2012, vol. 45, pp. 6774-6780.

Dang, H-S., et al., "Poly(Phenylene Oxide) Functionalized With Quaternary Ammonium Groups via Flexible Alkyl Spacers for High-performance Anion Exchange Membranes," Journal of Materials Chemistry A, Jan. 1, 2015, vol. 3, No. 10, pp. 5280-5284, XP055564621.

Date B et al., "Synthesis and morphology study of SEBS triblock copolymers functionalized with sulfonate and phosphonate groups for proton exchange membrane fuel cells," Macromolecules, 2018, 51(3), 1020-1030.

Diaz, A. M. et al., "A Novel, One-Pot Synthesis of Novel 3F, 5F, and 8F Aromatic Polymers", Macromolecular Rapid Communication, 2007, vol. 28, pp. 183-187.

Einsla ML et al., "Toward improved conductivity of sulfonated aromatic proton exchange membranes at low relative humidity," Chemistry of Materials, 2008, 20, 5636-5642.

EP Partial Supplementary European Search Report dated Dec. 20, 2021, in application No. EP19791619.0.

EP Office Action dated Mar. 12, 2020, in Application No. 15860054.4.

EP Search report dated Mar. 11, 2022, in Application No. EP19791619.0.

EP Supplemental Search Report and Written Opinion dated Jun. 15, 2018, in Application No. 15860054.4.

Ex Parte Quayle Action dated Mar. 5, 2019, in U.S. Appl. No. 15/527,967.

Extended European search report dated Jul. 22, 2022, in Application No. EP19889097.2.

Final Office Action dated Jun. 3, 2021, in U.S. Appl. No. 16/471,358.

Florin, R. E., "Catalyst Specificity in Friedel-Crafts Copolymerization", Journal of the American Chemical Society, 1951, vol. 73, No. 9, pp. 4468-4470.

(56) References Cited

OTHER PUBLICATIONS

Fox, C. J, et al., "The Synthesis of Polymers via Acylation of Triphenylamine", Macromolecular Chemistry and Physics, Mar. 15, 1965, vol. 82, No. 1, 53-59.
Fritz, A. et al., "Synthesis of Aryleneisopropylidene Polymers", Journal of Polymer Science, 1972, vol. 10, pp. 2365-2378.
George, J. et al., "Inhibition of Friedel-Crafts Polymerization[1]. I. The Mechanism of Inhibition", Journal of the American Chemical Society, 1950, vol. 72, No. 9, pp. 3891-3896.
George, J. et al., "Inhibition of Friedel-Crafts Polymerization[1]. II. Factors Affecting Inhibitor Power", Journal of the American Chemical Society, 1950, vol. 72, No. 9, pp. 3896-3901.
Goseki, R et al., "Synthesis of a Well-defined Alternating Copolymer of 1,1-diphenylethylene and Tert-butyldimethyl-silyloxymethyl Substituted Styrene by Anionic Copolymerization: Toward Tailored Graft Copolymers With Controlled Side-chain Densities", Polymer Chemistry, 2019, vol. 10, pp. 6413-6422.
Gottesfeld S et al., "Anion exchange membrane fuel cells: Current status and remaining challenges," Journal of Power Sources, 2018, 375, 170-184.
Gottesfeld S et al., "Direct ammonia fuel cells (DAFCs) for transport application," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/arpae09_bae_2019_p.pdf (last accessed Dec. 15, 2020), 26 pp.
Guzman-Guiterrez, et al., "Dramatic Enhancement of Superacid-Catalyzed Polyhydroxyalkylation Reactions," Macromolecules, 2011, 44, pp. 194-202.
Guzman-Gutierrez, M. T. et al., "Structure-properties Relationship for the Gas Transport Properties of New Fluoro-containing Aromatic Polymers", Journal of Membrane Science, 2011, vol. 385-386, pp. 277-284.
Guzman-Gutierrez, M. T. et al., "Synthesis and Gas Transport Properties of New Aromatic 3F Polymers", Journal of Membrane Science, 2008, vol. 323, pp. 379-385.
Han KW et al., "Molecular dynamics simulation study of a polysulfone-based anion exchange membrane in comparison with the proton exchange membrane, " The Journal of Physical Chemistry C, 2014, 118(24), 12577-12587.
Hao, J., et al., "Crosslinked High-performance Anion Exchange Membranes Based on Poly(Styrene-b-(Ethylene-co-butylene)-b-styrene)," Journal of Membrane Science, Jan. 24, 2018, vol. 551, pp. 66-75, XP055647135.
Haque, M.A. et al., "Acid Doped Polybenzimidazoles Based Membrane Electrode Assembly for High Temperature Proton Exchange Membrane Fuel Cell: A Review", International Journal of Hydrogen Energy, 2017, vol. 42, No. 14, pp. 9156-9179.
He, R et al., "Proton Conductivity of Phosphoric Acid Doped Polybenzimidazole and Its Composites with Inorganic Proton Conductors", Journal of Membrane Science, Dec. 1, 2003, vol. 226, No. 1-2, pp. 169-184.
Henkensmeier D et al., "Overview: State-of-the Art Commercial Membranes for Anion Exchange Membrane Water Electrolysis," Journal of Electrochemical Energy Conversion and Storage, 2021, 18, 024001 (18 pp.).
Hernandez, M.G. et al., "Novel, Metal-Free, Superacid-Catalyzed "Click" Reactions of Isatins with Linear, Nonactivated, Multiring Aromatic Hydrocarbons", Macromolecules, 2010, vol. 43, pp. 6968-6979.
Hickner M et al., "Membrane Databases—New Schema and Dissemination (Supplement to: Development of Design Rules for High Hydroxide Transport in Polymer Architectures)," at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/ia022_hickner_2019_p.pdf (last accessed Dec. 15, 2020), 14 pp.
Hu, H. et al."Preparation and Characterization of Anion Exchange Membranes based on Fluorinated Poly(aryl ether oxadiazole)s for AEMFCs Applications", International Journal of Hydrogen Energy, 2012, p. 61, https://kns.cnki.net/KCMS/detail/detail.aspxdbname=CMFD201401&filename=1013302180.nh.
Huang, B. et al., "Synthesis and Characterization of Poly(ether amide ether ketone)/Poly(ether ketone ketone) Copolymers", Journal of Applied Polymer Science, 2011, vol. 119, pp. 647-653.
Hwang T et al., "Ultrafiltration using graphene oxide surface-embedded polysulfone membranes," Separation and Purification Technology, 2016, 166, 41-47.
IN Office Action dated Mar. 23, 2022 in Application No. IN202037050645.
International Preliminary Report on Patentability and written opinion dated Aug. 4, 2022 in Application PCT/2021/US14759.
International Preliminary Report on Patentability dated Jan. 7, 2020 in Application No. PCT/US2018/040898.
International Preliminary Report on Patentability dated Jun. 25, 2019 in Application No. PCT/US2017/067482.
International Preliminary Report on Patentability dated May 23, 2017, in Application No. PCT/US2015/061036.
International Preliminary Report on Patentability dated Oct. 27, 2020, in Application No. PCT/US2019/028925.
International Search Report and Written Opinion dated Nov. 30, 2018 in Application No. PCT/US2018/040898.
International Search Report and Written Opinion dated Feb. 4, 2016, in Application No. PCT/US2015/061036.
International Search Report and Written Opinion dated Mar. 25, 2020, in Application No. PCT/US2019/063173.
International Search Report and Written Opinion dated Mar. 6, 2018, in Application No. PCT/US2017/067482.
International Search Report and Written Opinion dated May 27, 2021, in Application No. PCT/US2021/014759.
International Search Report and Written Opinion dated Sep. 16, 2019, in Application No. PCT/US2019/028925.
International Search Report dated Dec. 4, 2018 in Application No. PCT/US2018/040898.
Jeon JY et al., "Efficient Preparation of Styrene Block Copolymer Anion Exchange Membranes via One-Step Friedel-Crafts Bromoalkylation with Alkenes," Organic Process Research & Development, 2019, 23(8), 1580-1586.
Jeon JY et al., "Functionalization of Syndiotactic Polystyrene via Superacid-Catalyzed Friedel-Crafts Alkylation," Topics in Catalysis, 2018, 61(7-8), 610-615.
Jeon, J.Y., et al., "Ionic Functionalization of Polystyrene-b-poly(Ethylene-co-butylene)-b-polstyrene via Friedel-crafts Bromoalkylation and Its Application for Anion Exchange Membranes," ECS Transactions, Aug. 24, 2017, vol. 80, No. 8, pp. 967-970, XP055507090.
Jeon JY et al., "Synthesis of aromatic anion exchange membranes by Friedel-Crafts bromoalkylation and cross-linking of polystyrene block copolymers," Macromolecules, 2019, 52(5), 2139-2147.
Jeong, Y. et al., "Polymerization of a Photochromic Diarylethene by Friedel-Crafts Alkylation", Macromolecules, 2006, vol. 39, pp. 3106-3109.
Jia W et al., "Gas transport characteristics of fluorinated polystyrene-b-polybutadiene-b-polystyrene (F-SBS)," Journal of Membrane Science, 2019, 591, 117296 (24 pp.).
Jo TS et al., "Highly efficient incorporation of functional groups into aromatic main-chain polymer using iridium-catalyzed C—H activation and Suzuki-Miyaura reaction," Journal of the American Chemical Society 131, 2009,(5), 1656-1657.
Jo TS et al., "Synthesis of quaternary ammonium ion-grafted polyolefins via activation of inert C—H bonds and nitroxide mediated radical polymerization," Journal of Polymer Science Part A: Polymer Chemistry, 2009, 47(18), 4519-4531.
Jo TS et al., "Synthesis of sulfonated aromatic poly(ether amide) s and their application to proton exchange membrane fuel cells," Journal of Polymer Science Part A: Polymer Chemistry, 2009, 47(2), 485-496.
JP Notice of Refusal dated Dec. 15, 2020 for Application No. 2020-008602.

(56) References Cited

OTHER PUBLICATIONS

JP Notice of Refusal dated May 7, 2020 for Application No. 2017-526894.
JP Notice of Refusal dated Oct. 23, 2019 for Application No. 2017-526894.
JP Office Action dated Mar. 7, 2023 in Application No. JP2020-559544 with English translation.
JP Search Report by Authorized Searching Authority dated 17, 2020 for Application No. 2020-008602.
JP Search Report by Authorized Searching Authority dated Sep. 18, 2019 for Application No. 2017-526894.
Kazakova, et al., "Trifluoromethanesulfonic Acid in Organic Synthesis," Russian Journal of Organic Chemistry, 2017, vol. 53, No. 4, pp. 485-509.
Kim E et al., "Nanoscale building blocks for the development of novel proton exchange membrane fuel cells," The Journal of Physical Chemistry B, 2008, 112(11), 3283-3286.
Kim JH et al., "Fabrication of dense cerium pyrophosphate-polystyrene composite for application as low-temperature proton-conducting electrolytes," Journal of The Electrochemical Society, 2015, 162(10), F1159-F1164.
Kim S et al., "A Novel Sulfonated Aromatic Polymer Membrane with Different Pendant Groups for Vanadium Redox Flow Batteries (VRFBs)," 2018 AIChE Annual Meeting, 2018, 103g (3 pp.).
Kim S et al., "Novel Sulfonated Aromatic Polymer Membranes for Breaking the Coulombic and Voltage Efficiency Trade-Off Limitation in Vanadium Redox Flow Battery," 236th ECS Meeting (Oct. 13-17, 2019), ECS Meeting Abstracts, 2019, MA2019-02, 565 (2 pp.).
Kim YS, "Advanced Materials for Fully-Integrated MEAs in AEMFCs," presented at the 2018 U.S. Department of Energy (DOE) Hydrogen and Fuel Cells Program and Vehicle Technologies Office Annual Merit Review and Peer Evaluation Meeting on Jun. 13-15, 2018 in Washington, DC, accessible at https://www.hydrogen.energy.gov/pdfs/review18/fc146_kim_2018_o.pdf (last accessed Dec. 15, 2020), 25 pp.
Kim YS, "Scalable Elastomeric Membranes for Alkaline Water Electrolysis," presented at the 2019 U.S. Department of Energy (DOE) Hydrogen and Fuel Cells Program Annual Merit Review and Peer Evaluation Meeting on Apr. 29-May 1, 2019 in Crystal City, Virginia, accessible at https://www.hydrogen.energy.gov/pdfs/review19/p159_kim_2019_o.pdf (last accessed Dec. 15, 2020), 22 pp.
Kim YS, "Scalable Elastomeric Membranes for Alkaline Water Electrolysis," presented at the 2020 U.S. Department of Energy Hydrogen and Fuel Cells Program Annual Merit Review and Peer Evaluation Meeting on May 20, 2020, accessible at https://www.hydrogen.energy.gov/pdfs/review20/p159_kim_2020_p.pdf (last accessed Dec. 15, 2020), 29 pp.
Kim YS et al., "A New Class of Fuel Cells Based on Ion Pair-Coordinated Proton Exchange Membranes," 232nd ECS Meeting (Oct. 1-5, 2017), ECS Meeting Abstracts, 2017, MA2017-02, 1470 (2 pp.).
Kim YS et al., "Scalable Elastomeric Membranes for Alkaline Water Electrolysis," presented at the 2018 U.S. Department of Energy (DOE) Hydrogen and Fuel Cells Program Annual Merit Review and Peer Evaluation Meeting on Jun. 13-15, 2018 in Washington, D.C., accessible at https://www.hydrogen.energy.gov/pdfs/review18/pd159_kim_2018_p.pdf (last accessed Dec. 15, 2020), 23 pp.
Kim YS et al., "HydroGEN Seedling: Scalable Elastomeric Membranes for Alkaline Water Electrolysis," in 2018 Annual Progress Report: DOE Hydrogen and Fuel Cells Program, U.S. Department of Energy, Document No. DOE/GO-102019-5156, Apr. 2019, accessible at https://www.hydrogen.energy.gov/pdfs/progress18/h2f_kim_2018.pdf (last accessed Dec. 15, 2020), 4 pp.
Kim YS, "Polymer-based fuel cells that operate from 80-220°C.," presented at the 2018 U.S. Department of Energy (DOE) Hydrogen and Fuel Cells Program and Vehicle Technologies Office Annual Merit Review and Peer Evaluation Meeting on Jun. 13-15, 2018 in Washington, DC, accessible at https://www.hydrogen.energy.gov/pdfs/review18/fc175_kim_2018_o.pdf (last accessed Dec. 15, 2020), 24 pp.
Kimura, K.W., et al., "Selective Electrochemical CO2 Reduction During Pulsed Potential Stems From Dynamic Interface," ACS Catalysis, ACS Paragon Plus Environment, University of Illinois at Urbana-Champaign, Downloaded from pubs.acs.org on Jun. 30, 2020, 31 pages.
Ko K et al., "Effect of Temperature on Nanophase-segregation and Transport in Polysulfone-Based Anion Exchange Membrane Fuel Cell: Molecular Dynamics Simulation Approach," Bulletin of the American Physical Society, 2013, 58(1), H1.307 (1 p.).
KR Office Action dated Feb. 28, 2022, in KR Application No. KR1020177016429 with English translation.
Kraglund MR et al., "Ion-solvating membranes as a new approach towards high rate alkaline electrolyzers," Energy & Environmental Science, 2019, 12, 3313-3318.
Kraglund MR et al., Supplementary information for "Ion-solvating membranes as a new approach towards high rate alkaline electrolyzers," Energy & Environmental Science, 2019, 12, 3313-3318 (19 pp.).
Kreuer KD, "On the development of proton conducting polymer membranes for hydrogen and methanol fuel cells," Journal of Membrane Science, 2001, 185, 29-39.
Le TP et al., "Miscibility and acid strength govern contact doping of organic photovoltaics with strong polyelectrolytes," Macromolecules, 2015, 48(15), 5162-5171.
Lee, W. et al., "Poly (terphenylene) anion exchange membranes: the effect of backbone structure on morphology and membrane property," ACS Macro Letters, 2017, vol. 6, No. 5, pp. 566-570.
Lee, W. et al., "Robust Hydroxide Ion Conducting Poly(biphenyl)s for Alkaline Fuel Cell Membranes," ACS Macro Letters, 2015, vol. 4, No. 8, pp. 814-818.
Lee WH et al., "Fluorene-based hydroxide ion conducting polymers for chemically stable anion exchange membrane fuel cell," ACS Macro Letters, 2015, 4(4), 453-457.
Lee WH et al., "Molecular Engineering of Aromatic Polymer Electrolytes for Anion Exchange Membranes," ECS Transactions, 2017, 80(8), 941-944.
Lee WH et al., "Molecular Engineering of Ion-Conducting Polymers for Fuel Cell Membrane Applications," ECS Transactions, 2015, 69(17), 357-361.
Lee WH et al., Supporting Information for "Robust Hydroxide Ion Conducting Poly(biphenyl)s for Alkaline Fuel Cell Membranes," ACS Macro Letters, 2015, 4(8), 814-818 (pp. 1-16).
Lee YB et al., "Effect of Ammonium Ion Structures on Properties of Alkaline Exchange Membrane Fuel Cells," ECS Transactions, 2010, 33(1), 1889-1892.
Lee YB et al., "Novel Synthetic Approach and their Properties for Alkaline Exchange Polysulfone Membranes," 2011 ECS Meeting Abstracts, MA2011-02, 866 (2 pp.).
Leng Y et al., "Solid-State Water Electrolysis with an Alkaline Membrane," Journal of the American Chemical Society, 2012, 134, 9054-9057.
Leng Y et al., Supporting Information for "Solid-State Water Electrolysis with an Alkaline Membrane," Journal of the American Chemical Society, 2012, 134, 9054-9057 (13 pp.).
Leonard DP et al., "Asymmetric electrode ionomer for low relative humidity operation of anion exchange membrane fuel cells," Journal of Materials Chemistry A, 2020, 8(28), 14135-14144.
Lim, H et al., "Synthesis of Microporous Polymers by Friedel-crafts Reaction of 1-bromoadamantane with Aromatic Compounds and Their Surface Modification", Polymer Chemistry, 2012, vol. 3, pp. 868-870.
Liu, Z et al., "$BF_3 \cap Et_2O$-mediated Friedel-Crafts C—H bond polymerization to synthesize π-conjugation-interrupted polymer semiconductors", Polymer Chemistry, 2011, vol. 2, pp. 2179-2182.
Luo X et al., "Mesoscale Simulations of Quaternary Ammonium-Tethered Triblock Copolymers: Effects of the Degree of Functionalization and Styrene Content," Journal of Physical Chemistry C, 2020, 124(30), 16315-16323.
Maeyama, K. et al., "2,2'—Bis(4-benzoylphenoxy)biphenyl: A Novel Efficient Acyl-acceptant Monomer Yielding Wholly Aromatic

(56) References Cited

OTHER PUBLICATIONS

Polyketones via Friedel-Crafts Type Polymerization with Arenedicarbonyl Chloride", Polymer Journal, 2004, vol. 36, No. 2, pp. 146-150.

Maeyama, K. et al., "Effective Synthesis of Wholly Aromatic Polyketones Using 2,2'—Diaryloxybiphenyl and Arenedicarboxylic Acid Derivatives via Friedel-crafts Type Acylation Polymerization", Reactive & Functional Polymers, 2004, vol. 61, pp. 71-79.

Mallakpour, S. E, et al., "Polymerization of N-methylpyrrole With Bis-triazolinediones via Electrophilic Aromatic Substitution", Journal of Polymer Science: Part A: Polymer Chemistry, Oct. 1987, vol. 25, 2781-2790.

Mallakpour, S. E, et al., "Uncatalyzed Polymerization of Bistriazolinediones with Electron-Rich Aromatic Compounds via Electrophilic Aromatic Substitution", Journal of Polymer Science: Part A: Polymer Chemistry, 1989, vol. 27, 217-235.

Matanovic I et al., "Adsorption of polyaromatic backbone impacts the performance of anion exchange membrane fuel cells," Chemistry of Materials, 2019, 31(11), 4195-4204.

Maurya S et al., "On the origin of permanent performance loss of anion exchange membrane fuel cells: Electrochemical oxidation of phenyl group," Journal of Power Sources, 2019, 436, 226866.

Maurya S et al., "Polyaromatic Ionomers for High Performance Alkaline Membrane Fuel Cells," ECS Meeting Abstracts, 2019, MA2019-02, 1572 (3 pp.).

Maurya S et al., "Rational design of polyaromatic ionomers for alkaline membrane fuel cells with 1 W cm-2 power density," Energy & Environmental Science, 2018, 11(11), 3283-3291.

Maurya S et al., "Surface adsorption affects the performance of alkaline anion-exchange membrane fuel cells," ACS Catalysis, 2018, 8(10), 9429-9439.

Meek KM et al., "High-Throughput Anion Exchange Membrane Characterization at NREL," ECS Transactions, 2019, 92(8), 723-731.

Mittelsteadt C et al., "Dimensionally Stable High Performance Membranes," presented at the 2016 U.S. Department of Energy (DOE) Hydrogen and Fuel Cells Program and Vehicle Technologies Office Annual Merit Review and Peer Evaluation Meeting on Jun. 6-10, 2019 in Washington, D.C., accessible at https://www.hydrogen.energy.gov/pdfs/review16/fc150_mittelsteadt_2016_p.pdf (last accessed Dec. 15, 2020), 19 pp.

Mochizuki T et al., "Simple, Effective Molecular Strategy for the Design of Fuel Cell Membranes: Combination of Perfluoroalkyl and Sulfonated Phenylene Groups," ACS Energy Letters, 2016, 1(2), 348-352 (Abstract and Supporting Information only, 11 pp.).

Mohanty AD et al., "Anion Exchange Fuel Cell Membranes Prepared from C—H Borylation and Suzuki Coupling Reactions," Macromolecules, 2014, 47, 21973-1980.

Mohanty AD et al., "Mechanistic analysis of ammonium cation stability for alkaline exchange membrane fuel cells," Journal of Materials Chemistry A, 2014, 2(41), 17314-17320.

Mohanty AD et al., "Stable Elastomeric Anion Exchange Membranes Based on Quaternary Ammonium-Tethered Polystyrene-b-poly(ethylene-co-butylene)-b-polystyrene Triblock Copolymers," Macromolecules, 2015, 48(19), 7085-7095.

Mohanty AD et al., "Thermochemical stability study of alkyl-tethered quaternary ammonium cations for anion exchange membrane fuel cells," Journal of the Electrochemical Society, 2017, 164(13), F1279-F1285.

Mohanty AD et al., "Transition Metal-Catalyzed Functionalization of Polyolefins Containing C—C, C=C, and C—H Bonds," Advances in Organometallic Chemistry, 2015, 64, 1-39.

Mohanty AD et al., "Systematic alkaline stability study of polymer backbones for anion exchange membrane applications," Macromolecules, 2016, 49(9), 3361-3372.

Mohanty AD et al., "Systematic Analysis of Cation Stability in Alkaline Exchange Membrane Fuel Cells," ECS Transactions, 2014, 64(3), 1221-1228.

Noh S et al., "Molecular engineering of hydroxide conducting polymers for anion exchange membranes in electrochemical energy conversion technology," Accounts of Chemical Research, 2019, 52(9), 2745-2755.

Norsten TB et al., "Highly fluorinated comb-shaped copolymers as proton exchange membranes (PEMs): improving PEM properties through rational design," Advanced Functional Materials, 2006, 16, 1814-1822.

Notice of Allowance dated Nov. 22, 2021 in U.S. Appl. No. 16/553,965.

Notice of Allowance dated May 25, 2021, in U.S. Appl. No. 16/788,506.

Notice of Allowance dated May 29, 2019, in U.S. Appl. No. 15/527,967.

Nystuen, N. J, et al., "Friedel-crafts Polymerization of Fluorene With Methylene Chloride, Methoxyacetyl Chloride, and Chloromethyl Methyl Ether", Journal of Polymer Science, 1985, vol. 23, 1433-1444.

Office Action dated Feb. 25, 2021, in U.S. Appl. No. 16/471,358.
Office Action dated Jan. 6, 2021, for U.S. Appl. No. 16/628,879.
Office Action dated May 25, 2021, in U.S. Appl. No. 16/553,965.
Office Action dated Sep. 10, 2020, in U.S. Appl. No. 16/471,358.

Olvera, L.I. et al., "Novel High Molecular Weight Aromatic Fluorinated Polymers from One-Pot, Metal-Free Step Polymerizations", Macromolecules 2013, vol. 46, pp. 7245-7256.

Pagels M et al., "Synthetic Approach to Hydrocarbon Proton Exchange Membranes Using Anion Exchange Membrane Precursors," ECS Meeting Abstracts, 2020, MA2020-02, 2237 with Presentation (19 pp.).

Pagels MK et al., "One-Pot Synthesis of Proton Exchange Membranes from Anion Exchange Membrane Precursors," ACS Macro Letters, 2020, 9(10), 1489-1493.

Pagels MK et al., Supporting Information for "One-Pot Synthesis of Proton Exchange Membranes from Anion Exchange Membrane Precursors," ACS Macro Letters, 2020, 9(10), 1489-1493 (14 pp.).

Pagels MK et al., "Synthesis of anion conducting polymer electrolyte membranes by Pd-Catalyzed Buchwald-Hartwig Amination coupling reaction," Tetrahedron, 2019, 75(31), 4150-4155.

Park, E.J et al., "Chemically durable polymer electrolytes for solid-state alkaline water electrolysis," Journal of Power Sources, 2018, vol. 375, pp. 367-372.

Park EJ et al., "Dimethyl Substituted Polyaromatic Alkaline Ionomers for Better Alkaline Hydrogen Oxidation," ECS Meeting Abstracts, 2018, MA2018091, 1753 (3 pp.).

Park EJ et al., "How does a small structural change of anode ionomer make a big difference in alkaline membrane fuel cell performance?," Journal of Materials Chemistry A, 2019, 7(43), 25040-25046.

Park EJ et al., "Superacidic porous polymer catalyst and its application in esterification of carboxylic acid," Structural Chemistry, 2017, 28(2), 493-500.

Park EJ et al., "Versatile functionalization of aromatic polysulfones via thiol-ene click chemistry," Journal of Polymer Science Part A: Polymer Chemistry, 2016, 54(19), 3237-3243.

Park IS et al., "Sulfonated Polyamide Based IPMCs," Proceedings of SPIE, Electroactive Polymer Actuators and Devices (EAPAD) 2009, 7287, 72870X.

Park J et al., "A comparison study of ionic polymer-metal composites (IPMCs) fabricated with Nafion and other ion exchange membranes," Proceedings of SPIE, Electroactive Polymer Actuators and Devices (EAPAD) 2013, 8687, 868714.

Park J et al., "Electromechanical performance and other characteristics of IPMCs fabricated with various commercially available ion exchange membranes," Smart materials and structures, 2014, 23(7), 074001.

Parrondo J et al., "Synthesis and Alkaline Stability of Solubilized Anion Exchange Membrane Binders Based on Poly(phenylene oxide) Functionalized with Quaternary Ammonium Groups via a Hexyl Spacer," Journal of The Electrochemical Society, 2015, 162, F1236-F1242.

Parshad, R., "Determination of Transverse Wave Velocities in Solids", Nature, Nov. 30, 1946, vol. 158, pp. 789-790.

(56) References Cited

OTHER PUBLICATIONS

Pena, E.R., et al., "Factors Enhancing the Reactivity of Carbonyl Compounds for Polycondensations with Aromatic Hydrocarbons. A Computational Study," Macromlecules, 2004, 37(16), 6227-6235.
Perret R et al., "IV.F.4 Hydrogen Fuel Cells and Storage Technology Project," in 2008 Annual Progress Report: DOE Hydrogen Program, U.S. Department of Energy, accessible at https://www.hydrogen.energy.gov/pdfs/progress08/iv_f_4_perret.pdf (last accessed Dec. 15, 2020), pp. 776-786.
Perret R et al., "IV.G.1 Hydrogen Fuel Cells and Storage Technology Project (FCAST)," in 2007 Annual Progress Report: DOE Hydrogen Program, U.S. Department of Energy, accessible at https://www.hydrogen.energy.gov/pdfs/progress07/iv_g_1_perret.pdf (last accessed Dec. 15, 2020), pp. 638-647.
Perret R et al., "IV.G.4 Fundamental Research for Optimization of Hydrogen Storage and Utilization," in 2006 Annual Progress Report: DOE Hydrogen Program, U.S. Department of Energy, accessible at https://www.hydrogen.energy.gov/pdfs/progress06/iv_g_4_perret.pdf (last accessed Dec. 15, 2020), pp. 575-581.
Perret R et al., "IV.H.5 Hydrogen Fuel Cells and Storage Technology Project," in 2009 Annual Progress Report: DOE Hydrogen Program, U.S. Department of Energy, accessible at https://www.hydrogen.energy.gov/pdfs/progress09/iv_h_5_perret.pdf (last accessed Dec. 15, 2020), pp. 801-807.
Powers W et al., "Borylation of Polystyrene: Random Blocky vs. Truly Random Copolymers," Bulletin of the American Physical Society, 2009, 54(1), C1.089 (1 p.).
Sepehr, F., et al., "Mesoscale Simulations of Anion Exchange Membranes Based on Quaternary Ammonium Tethered Triblock Copolymers," Macromolecules, Jun. 5, 2017, vol. 50, pp. 4397-4405, XP055564626.
Shin D et al., "Ch. 8: Anion Exchange Membranes: Stability and Synthetic Approach," in The Chemistry of Membranes Used in Fuel Cells: Degradation and Stabilization, S. Schlick (eds.), Wiley, 2018, pp. 195-228.
Shin J et al., "A new homogeneous polymer support based on syndiotactic polystyrene and its application in palladium-catalyzed Suzuki-Miyaura cross-coupling reactions," Green Chemistry, 2009, 11(10), 1576-1580.
Shin J et al., "Borylation of Polystyrene," Synfacts 2008 (2), 145.
Shin J et al., "Controlled Functionalization of Crystalline Polystyrenes via Activation of Aromatic C—H Bonds," Macromolecules, 2007, 40(24), 8600-8608.
Shin J et al., "Hydrophilic functionalization of syndiotactic polystyrene via a combination of electrophilic bromination and Suzuki-Miyaura reaction," Journal of Polymer Science Part A: Polymer Chemistry, 2010, 48(19), 4335-4343.
Shin J et al., "Hydrophilic graft modification of a commercial crystalline polyolefin," Journal of Polymer Science Part A: Polymer Chemistry, 2008, 46(11), 3533-3545.
Sivakami JN et al., "'Kick-started' oxetanes in photoinitiated cationic polymerization: scale-up synthesis and structure-property studies," Proceedings of RadTech International UV & EB Technology Expo & Conference (held on May 15-18, 2016 in Chicago, IL), 2016, 5 pp.
Smedley SB et al., "Measuring water hydrogen bonding distributions in proton exchange membranes using linear Fourier Transform Infrared spectroscopy," Solid State Ionics, 2015, 275, 66-70.
Smedley SB et al., "Spectroscopic Characterization of Sulfonate Charge Density in Ion-Containing Polymers," The Journal of Physical Chemistry B, 2017, 121(51), 11504-11510.
Tian D et al., "Phosphoric Acid-Doped Biphenyl-Backbone Ion-Pair Coordinated Pems with Broad Relative Humidity Tolerance," ECS Meeting Abstracts, 2020, MA2020-02, 2240 (2 pp.).
Tian D et al., "Phosphoric Acid-Doped Ion-Pair Coordinated PEMs with Broad Relative Humidity Tolerance," Energies, 2020, 13(8), 1924 (14 pp.).
Tian D et al., "Structure and gas transport characteristics of triethylene oxide-grafted polystyrene-b-poly(ethylene-co-butylene)-b-polystyrene," Journal of Polymer Science 2020, 58(18), 2654-2663.
Tipper, C. F. H., et al., "Some Reactions of Cyclopropane and a Comparison With the Lower Olefins. Part IV. Friedel-crafts Polymerisation", Journal of the Chemical Society, 1959, pp. 1325-1359.
Trant C et al., "Impact of Microstructured Morphology on Macroscale Properties of Semi-Crystalline Triblock Copolymer Anion Exchange Membranes," ECS Meeting Abstracts, 2020, MA2020-01, 2267 (2 pp.).
Trant C et al., "Synthesis and Characterization of Anion-Exchange Membranes Using Semicrystalline Triblock Copolymers in Ordered and Disordered States," Macromolecules 2020, 53(19), 8548-8561.
U.S. Corrected Notice of Allowability dated Dec. 27, 2021, in U.S. Appl. No. 16/553,965.
U.S Corrected Notice of Allowability Dec. 15, 2021 in U.S. Appl. No. 16/788,506.
U.S. Corrected Notice of Allowance dated Dec. 8, 2022 in U.S. Appl. No. 16/471,358.
US Final Office Action dated Sep. 3, 2021, in U.S. Appl. No. 16/553,965.
U.S. Non-Final office Action dated Jan. 10, 2023 in U.S. Appl. No. 17/652,175.
U.S. Non-Final Office Action dated Mar. 18, 2022, in U.S. Appl. No. 16/471,358.
U.S. Non-Final Office Action dated Oct. 14, 2021 in U.S. Appl. No. 16/842,037.
U.S. Non-Final office Action dated Sep. 29, 2022 in U.S. Appl. No. 17/658,627.
US Notice of Allowance dated on Sep. 8, 2021, in U.S. Appl. No. 16/788,506.
US Notice of Allowance dated on Sep. 15, 2021, in U.S. Appl. No. 16/788,506.
U.S. Notice of Allowance dated Sep. 28, 2022 in U.S. Appl. No. 16/471,358.
U.S. Appl. No. 17/758,767, inventors Bae et al., filed Jul. 13, 2022.
U.S. Appl. No. 18/068,649, Inventors Bae et al., filed Dec. 19, 2022.
U.S. Restriction Requirement dated Jan. 6, 2022, in U.S. Appl. No. 16/471,358.
Velasco, V.M. et al., "Novel Aromatic Polymers with Pentafluorophenyl Pendant Groups", Macromolecules, 2008, vol. 41, pp. 8504-8512.
Walgama R et al., "The Effect of Backbone Structure on Functional Properties in Anion Exchange Membranes; Comparison of Poly (fluorene) with Poly (biphenylene) and Poly (terphenylene)s," ECS Meeting Abstracts, 2020, MA2020-02, 2268 (3 pp.).
Wang, J. et al., "Poly(aryl piperidinium) membranes and ionomers for hydroxide exchange membrane fuel cells", Nature Energy, 2019, vol. 4, pp. 392-398.
Wang J et al., Supplementary Information for "Poly(aryl piperidinium) membranes and ionomers for hydroxide exchange membrane fuel cells," Nature Energy, 2019, 4, 392-398 (13 pp.).
Wang T et al., "Poly (terphenylene) anion exchange membranes with high conductivity and low vanadium permeability for vanadium redox flow batteries (VRFBs)," Journal of Membrane Science, 2020, 598, 117665.
Wang T et al., Supplementary Information for "Suppressing vanadium crossover using sulfonated aromatic ion exchange membranes for high performance flow batteries," Materials Advances, 2020, 1(7), 2206-2218 (15 pp.).
Wang T et al., "Suppressing vanadium crossover using sulfonated aromatic ion exchange membranes for high performance flow batteries," Materials Advances, 2020, 1(7), 2206-2218.
Weck PF et al., "Nanoscale building blocks for the development of novel proton-exchange membranes fuel cells: A first-principles study," Bulletin of the American Physical Society, 2008, 53(2), C1.095 (1 p.).
Wi SN et al., "Study of Water Dynamics in Superacidic Hydrocarbon Proton Exchange Membranes Using Solid-State and Pulsed-Field Gradient NMR Spectroscopy," National High Magnetic Field Laboratory 2015 Annual Research Report, 2015 (1 p.).
Xu H, "Novel Fluorinated Ionomer for PEM Fuel Cells," presented at the 2018 U.S. Department of Energy (DOE) Hydrogen and Fuel Cells Program and Vehicle Technologies Office Annual Merit Review and Peer Evaluation Meeting on Jun. 13-15, 2018 in Washington, DC, accessible at https://www.hydrogen.energy.gov/pdfs/review18/fc185_xu_2018_p.pdf (last accessed Dec. 15, 2020), 15 pp.

(56) References Cited

OTHER PUBLICATIONS

Xu, Y., et al., "Self-Cleaning CO2 Reduction Systems: Unsteady Electrochemical Forcing Enables Stability," ACS Energy Letters, 2021, 6, pp. 809-815.
Yang ZT et al., "Photoinitiated cationic polymerization of sustainable epoxy and oxetane thermosets," Proceedings of RadTech International UV & EB Technology Expo & Conference (held on May 15-18, 2016 in Chicago, IL), 2016, 5 pp.
Yim W et al., "Development of Ultrafiltration Membrane-Separation Technology for Energy-Efficient Water Treatment and Desalination Process," Final Report for DOE Award No. De-SC0005062, 2016, 18 pp.
Yin Z et al., "An alkaline polymer electrolyte CO2 electrolyzer operated with pure water," Energy & Environmental Science, 2019, 12, 2455-2462.
Yin Z et al., Supporting Information for "An alkaline polymer electrolyte CO2 electrolyzer operated with pure water," Energy & Environmental Science, 2019, 12, 2455-2462 (7 pp.).
Yokota et al., "Anion Conductive Aromatic Block Copolymers Continuing Diphenyl Ether or Sulfide Groups for Application to Alkaline Fuel Cells," vol. 6, No. 19, Oct. 8, 2014, pp. 17044-17052.
Yonezawa, N. et al., "Electrophilic Aromatic Acylation Synthesis of Wholly Aromatic Polyketones Composed of 2,2'-Dimethoxybiphenylene Units", 2003, Polymer Journal, vol. 35, No. 12, pp. 998-1002.
Yonezawa, N, et al., "Synthesis of Wholly Aromatic Polyketones", Polymer Journal, 2009, vol. 41, No. 11, pp. 899-928.
Yoshimura K et al., "Aromatic Polymer with Pendant Perfluoroalkyl Sulfonic Acid for Fuel Cell Applications," Macromolecules, 2009, 42(23), 9302-9306 (Abstract and Supporting Information only, 8 pp.).
Zelovich T et al., "Ab initio molecular dynamics study of hydroxide diffusion mechanisms in nanoconfined structural mimics of anion exchange membranes," The Journal of Physical Chemistry C, 2019, 123(8), 4638-4653.
Zelovich T et al., "Anion Exchange Membranes with Low Hydration Conditions from an Ab Initio Molecular Dynamics Perspective," ECS Meeting Abstracts, 2019, MA2019-01, 1957 (2 pp.).
Zelovich T et al., "Hydroxide ion diffusion in anion-exchange membranes at low hydration: insights from ab initio molecular dynamics," Chemistry of Materials, 2019 31(15), 5778-5787.
Zeng QH et al., "Anion exchange membranes based on quaternized polystyrene-block-poly (ethylene-ran-butylene)-block-polystyrene for direct methanol alkaline fuel cells," Journal of Membrane Science, 2010, 349(1-2), 237-243.
Zhu L et al., "Effects of tertiary amines and quaternary ammonium halides in polysulfone on membrane gas separation properties," Journal of Polymer Science Part B: Polymer Physics, 2018, 56(18), 1239-1250.
IN Office Action dated Feb. 1, 2024 in IN Application No. 202117027525.
U.S. Corrected Notice of Allowance dated Jan. 26, 2024 in U.S. Appl. No. 17/569,564.
U.S. Notice of Allowance dated Jan. 5, 2024 in U.S. Appl. No. 17/569,564.
U.S. Restriction Requirement dated Feb. 9, 2024 in U.S. Appl. No. 17/050,256.
CN Office Action dated Jul. 7, 2023, in application No. CN201980077678 with English translation.
CN Office Action dated Jun. 25, 2023, in Application No. CN201980041740.0 with English translation.
U.S. Corrected Notice of Allowance dated Aug. 4, 2023, in U.S. Appl. No. 17/658,627.
U.S. Non-Final Office Action dated Oct. 31, 2022, in U.S. Appl. No. 17/569,564.
U.S. Notice of Allowance dated Jul. 17, 2023 in U.S. Appl. No. 17/658,627.
U.S. Notice of Allowance dated May 30, 2023 in U.S. Appl. No. 17/569,564.
BR Office Action dated Aug. 17, 2023, in Application No. BR112021010146-2 with English Translation.
CA Office Action dated Jan. 26, 2022, in Application No. CA2968110.
CN Office Action dated Dec. 1, 2023 in CN Application No. 202180016258.9 with English Translation.
CN Office Action dated Oct. 31, 2023 in CN Application No. 201980041740.0, with English Translation.
IL office action dated Feb. 21, 2023, in application No. IL294876, with English Translation.
IN Office Action dated Dec. 26, 2022 in Application No. IN202117027525.
JP Office Action dated Oct. 31, 2023, in application No. JP2021-529055, with English Translation.
U.S. Corrected Notice of Allowance dated Nov. 27, 2023 in U.S. Appl. No. 17/569,564.
U.S. Notice of Allowance dated Sep. 7, 2023 in U.S. Appl. No. 17/569,564.
U.S. Appl. No. 18/381,141, inventors Bae C, et al., filed Oct. 17, 2023.
U.S. Appl. No. 18/381,149, inventors Bae C, et al., filed Oct. 17, 2023.
U.S. Appl. No. 18/493,772, inventors Bae C, et al., filed Oct. 24, 2023.

\* cited by examiner

PHOSPHATE ANION-QUATERNARY AMMONIUM ION PAIR COORDINATED POLYMER MEMBRANES

CROSS REFERENCE TO RELATED APPLICATIONS

This application is a 371 Nation Phase application of Application No. PCT/US2019/063173, filed Nov. 26, 2019, which claims the benefit of U.S. Provisional Patent Applications Nos. 62/940,084, filed Nov. 25, 2019, and 62/771,372, filed on Nov. 26, 2018, which are incorporated herein by reference in their entireties.

STATEMENT REGARDING FEDERALLY SPONSORED RESEARCH OR DEVELOPMENT

This invention was made with government support under grant no. DE-AR0000769 awarded by the Department of Energy ARPA-E, and DE-SC0018456 awarded by the Department of Energy SBIR/STTR Program. The government has certain rights in the invention.

BACKGROUND

Currently most ion exchange membranes (cationic and anionic) are prepared from aromatic polymers by direct sulfonation and chloromethylation, respectively, followed by substitution reaction with an amine, generating cation exchange membranes and anion exchange membranes, respectively. In cation exchange membranes, sulfonate groups are directly attached to aromatic rings of polymers. In anion exchange membranes, benzyltrimethyl ammonium groups are attached to the side-chain of polymers.

Unfortunately, these materials suffer from reduced ion conductivity when relative humidity (RH) is decreased. In most proton exchange membranes (e.g. perfluoroacid ionomer such as Nafion), proton conductivity is derived from the dissociation of proton from the pendant sulfonate side chain and diffusion of water molecules that carry the proton. As a result, their proton conduction uses humidified gas inlet to provide relatively high hydration level (e.g. >80% RH) and the proton conductivity drops sharply as RH decreases (Nafion has proton conductivity of 89 mS/cm at 90% RH and 80° C., however, it sharply decreases to 22 mS/cm at 50% RH and 80° C.).

SUMMARY

Some embodiments of the present disclosure are directed to an ion exchange membrane material including a polymer according to Formula I:

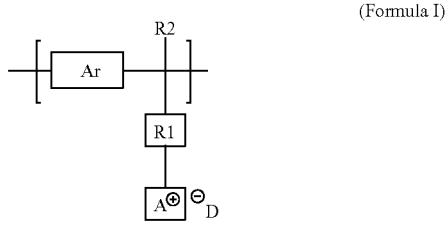

(Formula I)

In some embodiments, Ar includes one or more aryl groups. In some embodiments, the one or more aryl groups include:

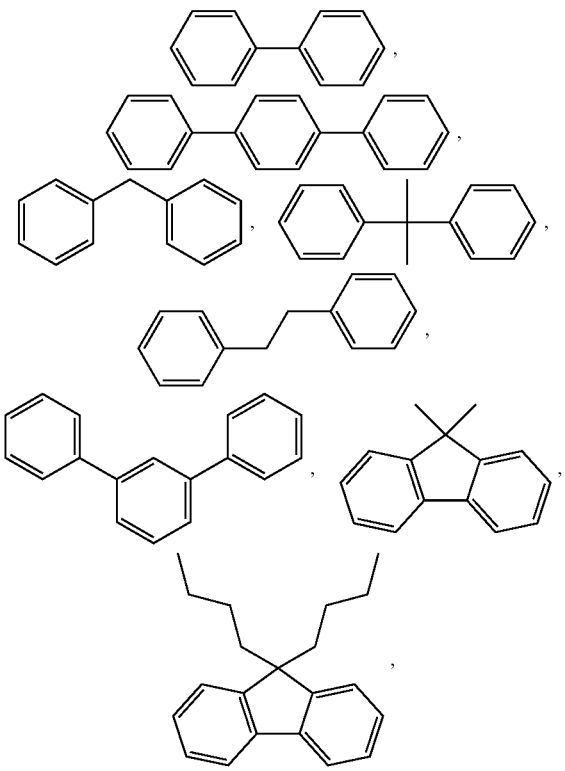

or combinations thereof. In some embodiments, R1 is a hydrocarbyl group. In some embodiments, A is a quaternary ammonium group. In some embodiments, A includes trimethylamine, 1-methylpiperidine, pyridine, 1,2-dimethylimidazole, quinuclidine, pentamethylguanidine, or combinations thereof. In some embodiments, D is an ionic dopant. In some embodiments, the ionic dopant includes dihydrogen phosphate anions and phosphoric acid molecules. In some embodiments, the number of phosphoric acid molecules per A group is above about 9. In some embodiments, the number of phosphoric acid molecules per A group is above about 14. In some embodiments, R2 is a halocarbyl group. In some embodiments, the halocarbyl group includes $CF_3$. The ion exchange membrane material according to claim 1, wherein R1 includes a hydrocarbyl chain, a hydrocarbyl ring, or combinations thereof.

Some embodiments of the present disclosure are directed to a method of making an ion exchange membrane material, including providing one or more polymers, the one or more polymers including a plurality of repeating units, wherein the repeating units include a backbone including one or more aryl groups, a halocarbyl group attached to the backbone, and a halocarbyl side chain attached to the backbone, wherein the halocarbyl side chain includes a halide separated from the backbone by a hydrocarbyl chain, a hydrocarbyl ring, or combinations thereof. In some embodiments, the method includes substituting the halide with a tertiary amine to form an amine-substituted polymer and halide anions, exchanging halide anions with hydroxide anions, and contacting the amine-substituted polymer and hydroxide anions with an inorganic acid to provide an ionic dopant to the amine-substituted polymer. In some embodiments, the one or more polymers are provided as a crosslinked polymer network. In some embodiments, the tertiary amine includes trimethylamine, 1-methylpiperidine, pyridine, 1,2-dimethylimidazole, quinuclidine, pentamethylguanidine, or combinations thereof. In some embodiments, the inorganic acid is phosphoric acid. In some embodiments, the number of inorganic acid molecules per amine group is above about 9. In some embodiments, the number of inorganic acid molecules per amine group is above about 14.

Some embodiments of the present disclosure are directed to an electrochemical energy conversion system including an anode, a cathode, and an ion exchange membrane disposed between the anode and the cathode. In some embodiments, the ion exchange membrane includes a polymer according to Formula I:

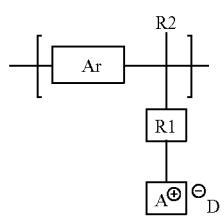

(Formula I)

In some embodiments, Ar includes one or more aryl groups. In some embodiments, R1 is a hydrocarbyl group. In some embodiments, A is quaternary ammonium group. In some embodiments, A includes trimethylamine, 1-methylpiperidine, pyridine, 1,2-dimethylimidazole, or combinations thereof. In some embodiments, D is an ionic dopant. In some embodiments, the ionic dopant includes dihydrogen phosphate anions and phosphoric acid molecules. In some embodiments, R2 is a halocarbyl group.

In some embodiments, the ion exchange membrane is disposed on a reinforcing substrate. In some embodiments, the reinforcing substrate includes a polyethylene mesh. In some embodiments, D includes one or more anions and one or more dopant molecules, and the number of dopant molecules per A group is above about 9.

DETAILED DESCRIPTION

Figure 1:
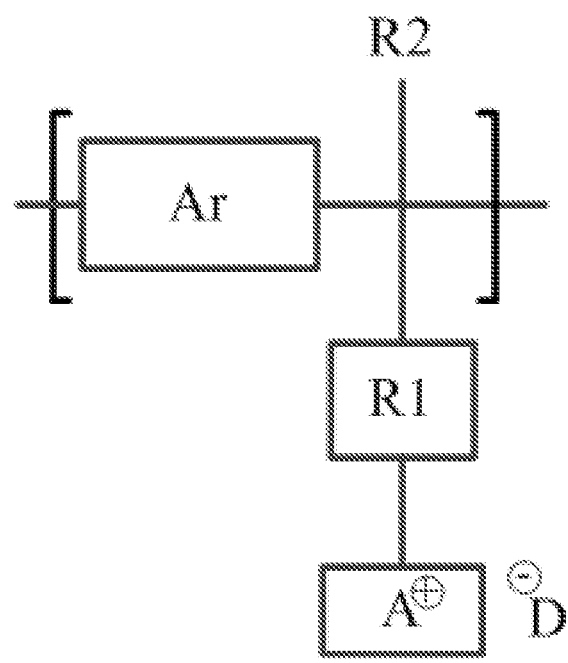
FIG. 1 is a schematic representation of an ion exchange membrane material according to some embodiments of the present disclosure.

Referring now to FIG. 1, aspects of the disclosed subject matter include an ion exchange membrane material composed of one or more polymers. In some embodiments, the one or more polymers are composed of a plurality of repeating polymer units. In some embodiments, each of the repeating polymer units include substantially the same structure. In some embodiments, the one or more polymers include two or more structurally different repeating polymer units. In some embodiments, the one or more polymers are crosslinked. In some embodiments, the one or more polymers are copolymers or block copolymers. In some embodiments, the one or more polymers include the following formula:

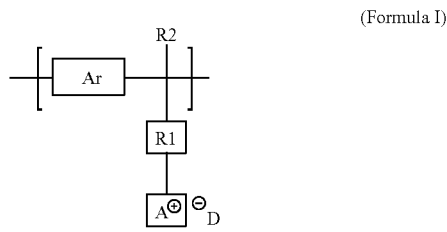

(Formula I)

In some embodiments, Ar includes one or more aryl groups. In some embodiments, Ar includes a hydrocarbyl chain with one or more aryl groups incorporated into the chain, grafted onto the chain, or combinations thereof. As used herein, the term "hydrocarbyl" is used to refer to saturated and unsaturated hydrocarbon compounds. In some embodiments, the one or more aryl groups include:

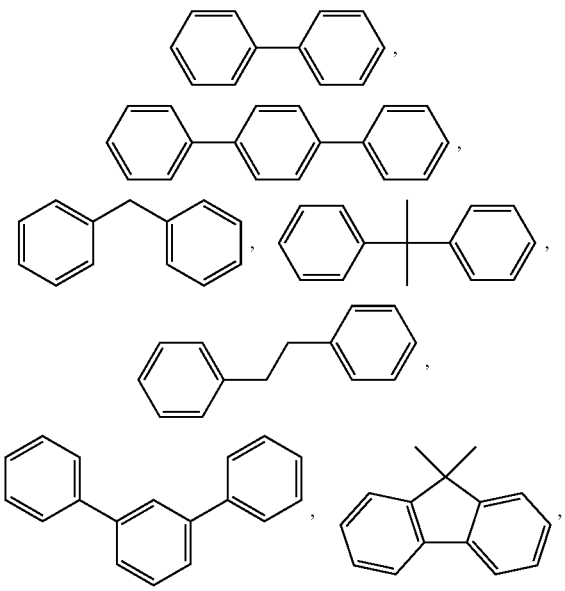

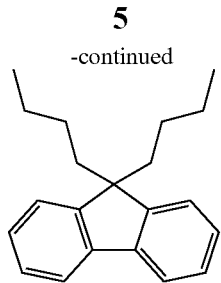

or combinations thereof.

In some embodiments, R1 is a hydrocarbyl group. In some embodiments, R1 includes a hydrocarbyl chain, a hydrocarbyl ring, or combinations thereof. In some embodiments, R1 is linear, branched, or combinations thereof. In some embodiments, R2 is a halocarbyl group. In some embodiments, R2 includes $CF_3$. In some embodiments, group "A" is a quaternary ammonium group. In some embodiments, A includes trimethylamine (TMA), 1-methylpiperidine (Pip), pyridine (Pyr) and 1,2-dimethylimidazole quinuclidine (Quin), pentamethylguanidine (PMG), or combinations thereof. In some embodiments, group "D" is an ionic dopant. In some embodiments, D includes one or more anions and one or more dopant molecules, e.g., acids, bases, or combinations thereof. In some embodiments, the number of dopant molecules per A group is above about 9. In some embodiments, the number of dopant molecules per A group is above about 14. In some embodiments, D includes dihydrogen phosphate anions and phosphoric acid molecules. Without wishing to be bound by theory, the doped ion-pair coordinated membranes of the present disclosure, such as those doped with phosphoric acid, use ionic dopant molecules surrounding the quaternary ammonium groups as carriers for proton transport. As a result, they are able to conduct protons at fairly low relative humidity conditions, particularly as compared to existing membrane materials such as Nafion®. Without wishing to be bound by theory, the improved conductivity at low and intermediate RH originates from the reduced dependence of proton conductivity on the presence of water molecules.

Figure 2:
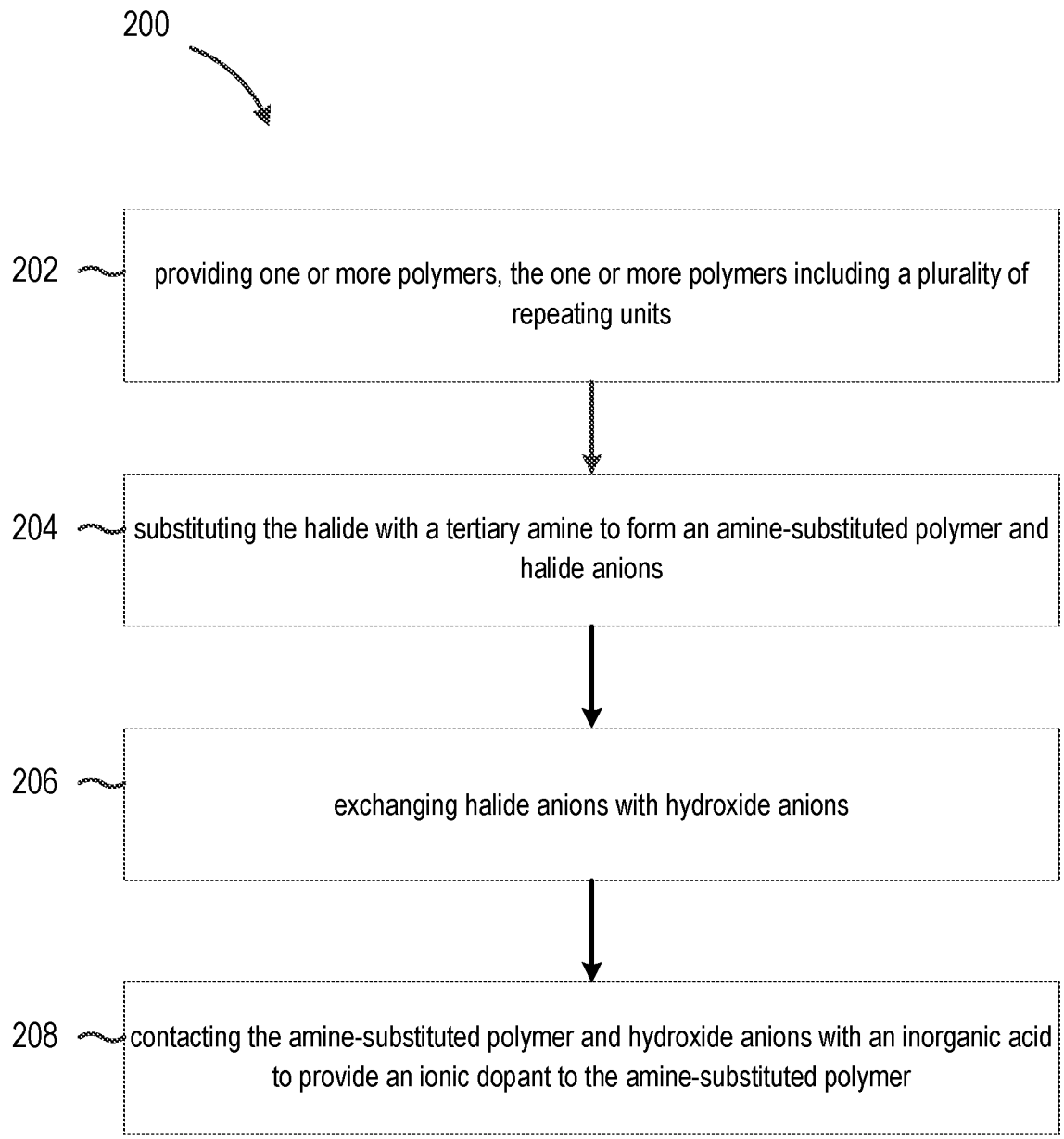
FIG. 2 is a chart of a method of making an ion exchange membrane material according to some embodiments of the present disclosure.

Referring now to FIG. 2, some embodiments of the present disclosure are directed to a method 200 of making an ion exchange membrane material. At 202, one or more polymers is provided. In some embodiments, the one or more polymers are provided as a crosslinked polymer network. In some embodiments, the one or more polymers include a plurality of repeating units. In some embodiments, the repeating units include a backbone including one or more aryl groups, a halocarbyl group attached to the backbone, and a halocarbyl side chain attached to the backbone. In some embodiments, the halocarbyl side chain includes a halide separated from the backbone by a hydrocarbyl chain, a hydrocarbyl ring, or combinations thereof. At 204, the halide is substituted with a tertiary amine to form an amine-substituted polymer and halide anions. In some embodiments, the tertiary amine includes trimethylamine, 1-methylpiperidine, pyridine, 1,2-dimethylimidazole, quinuclidine, pentamethylguanidine, or combinations thereof. At 206, halide anions are exchanged with hydroxide anions. At 208, the amine-substituted polymer and hydroxide anions are contacted with an inorganic acid to provide an ionic dopant to the amine-substituted polymer. In some embodiments, the inorganic acid is contacted with the amine-substituted polymer in excess. In some embodiments, the amine-substituted polymer and hydroxide anions are immersed in the inorganic acid. In some embodiments, the inorganic acid is sprayed or otherwise deposited on the amine-substituted polymer and hydroxide anions. In some embodiments, the inorganic acid is phosphoric acid. Without wishing to be bound by theory, dihydrogen phosphate anion ($H_2PO_4^-$) is formed after the first molecule of phosphoric acid is deprotonated by hydroxide anions. The remaining phosphoric acid molecules are then held as a cluster surrounding the quaternary ammonium of the amine-substituted polymer, e.g., via hydrogen bonds. As discussed above, in some embodiments, the number of dopant molecules, e.g., phosphoric acid molecules, per amine group is above about 9. In some embodiments, the number of dopant molecules per amine group is above about 14.

Figure 3:
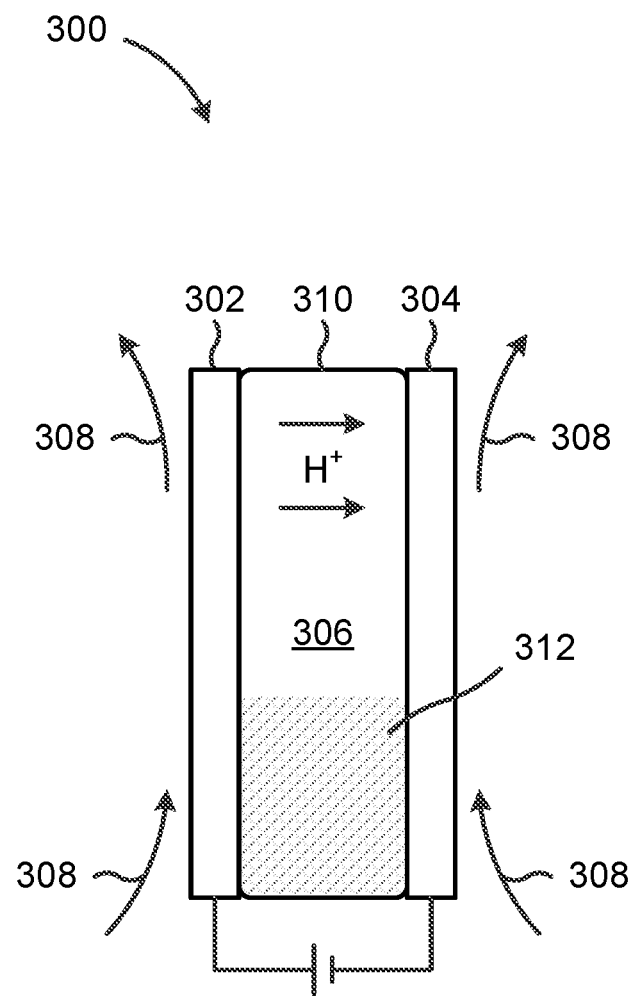
FIG. 3 is a schematic drawing of an electrochemical energy conversion system including an ion exchange membrane according to some embodiments of the present disclosure.

Referring now to FIG. 3, some embodiments of the present disclosure are directed to an electrochemical energy conversion system 300. In some embodiments, system 300 includes an anode 302, a cathode 304, and an electrolyte 306 disposed between the anode and the cathode. System 300 is suitable for use in numerous applications, such as electrochemical hydrogen compressors, fuel cells, electrolyzers, energy recovery ventilation systems, batteries, sensors, actuators, etc. In some embodiments, anode 302 and cathode 304 are composed of any suitable material for use with electrolyte 306 in system 500. In some embodiments, system 300 includes any inlets/outlets 308 to supply reactants to and remove reaction products from anode 302, cathode 304, and electrolyte 306. In some embodiments, system 300 includes a catalyst layer (not pictured).

In some embodiments, electrolyte 306 includes a solid electrolyte. In some embodiments, electrolyte 306 includes an ion exchange membrane 310 including the ion exchange membrane material discussed above. In some embodiments, the ion exchange membrane 310 is a proton exchange membrane. In some embodiments, ion exchange membrane 310 includes a reinforcing substrate 312. In some embodiments, the reinforcing substrate 312 includes a polyethylene mesh.

In some embodiments, system 300 is operated at a relative humidity below about 90%. In some embodiments, system 300 is operated at a relative humidity below about 85%. In some embodiments, system 300 is operated at a relative humidity below about 80%. In some embodiments, system 300 is operated at a relative humidity below about 75%. In some embodiments, system 300 is operated at a relative humidity below about 70%. In some embodiments, system 300 is operated at a relative humidity below about 65%. In some embodiments, system 300 is operated at a relative humidity below about 60%. In some embodiments, system 300 is operated at a temperature above about 80° C. In some embodiments, system 300 is operated at a temperature above about 90° C. In some embodiments, system 300 is operated at a temperature above about 100° C. In some embodiments, system 300 is operated at a temperature above about 110° C. In some embodiments, system 300 is operated at a temperature above about 120° C. In some embodiments, system 300 is operated at a temperature above about 130° C. In some embodiments, system 300 is operated at a temperature above about 140° C. In some embodiments, system 300 is operated at a temperature above about 150° C. In some embodiments, system 300 is operated at a temperature above about 160° C. In some embodiments, system 300 is operated at a temperature above about 170° C. In some embodiments, system 300 is operated at a temperature above about 180° C. In some embodiments, system 300 is operated at a temperature above about 190° C. In some embodiments, system 300 is operated at a temperature above about 200° C.

EXAMPLES

BPBr-100 underwent substitution reaction with different tertiary amines including trimethylamine (TMA), 1-methylpiperidine (Pip), pyridine (Pyr) and 1,2-dimethylimidazole (DMIm) to afford different quaternary ammonium (QA)-bearing ionic polymers named as BPN1-TMA, BPN1-Pip, BPN1-Pyr, and BPN1-DMIm, respectively. The bromide anion (Br⁻) of BPN1s were ion-exchanged to hydroxide anion (OH⁻), and the membranes were immersed in phosphoric acid (85 wt %, aq) during the doping process. As discussed above, without wishing to be bound by theory, dihydrogen phosphate anion ($H_2PO^{4-}$) was formed after the first molecule of phosphoric acid (PA) was deprotonated by hydroxide anion, and the remaining PA molecules were held as a cluster surrounding the QA via hydrogen bonds.

Figure 4:
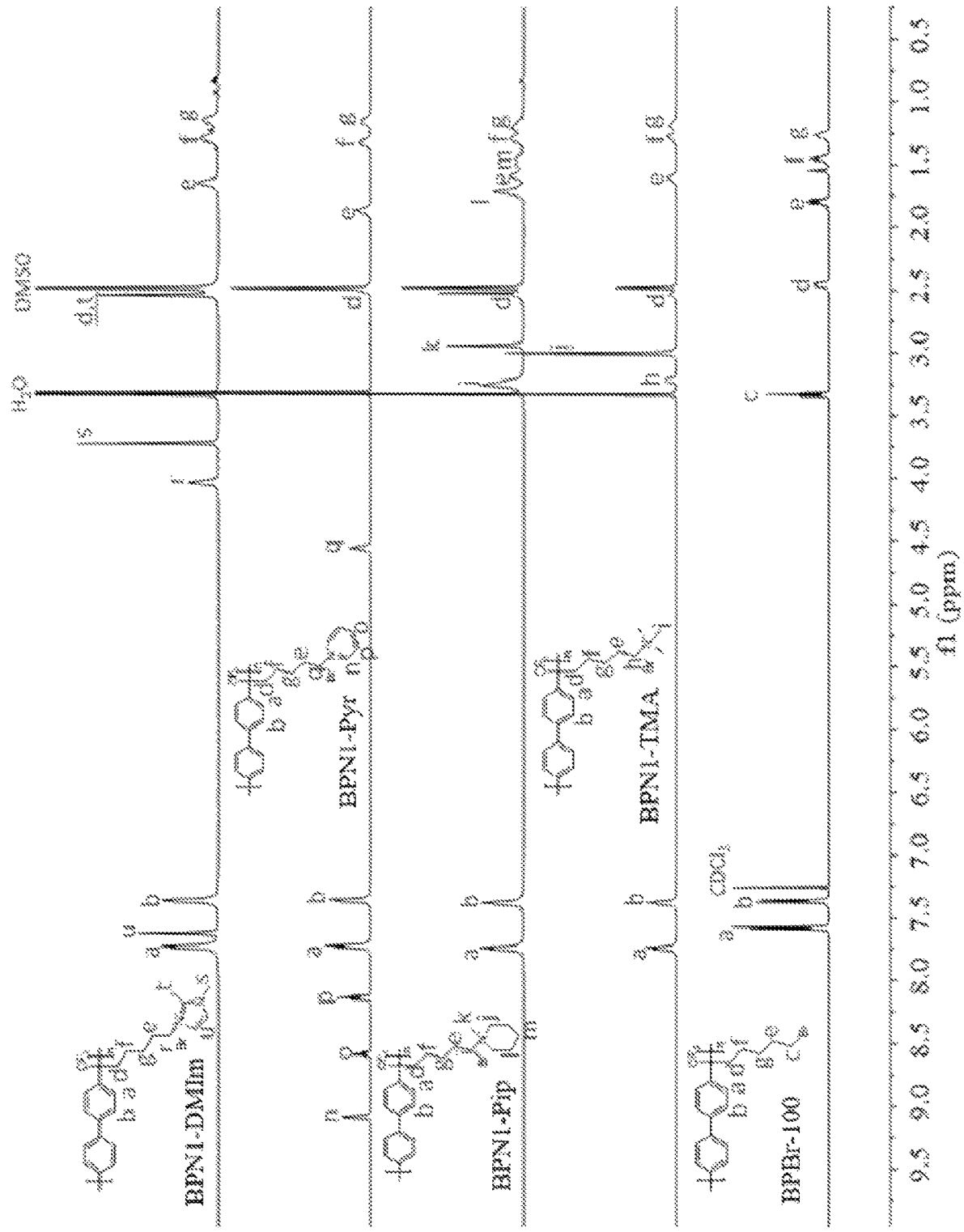
FIG. 4 shows $^1$H NMR spectrums for ion exchange membrane materials according to some embodiments of the present disclosure in comparison with a precursor polymeric material.

Referring now to FIG. 4, the synthesis of QA polymers was successfully confirmed by 1H NMR spectroscopy. The NMR peaks agree with expected chemical structures: the peak c related to $CH_2Br$ of BPBr-100 disappeared after quaternization reaction, and corresponding proton signals of different QA groups emerged accordingly.

The PA content within the membrane was characterized by doping level, defined as the average number of PA molecules per base group (QA in this case). Doping level was experimentally obtained by acid-base titration and the results are summarized in Table 1. BPN1-TMA and BPN1-Pip show relatively high doping levels (16 and 15, respectively), while BPN1-DMIm and BPN1-Pyr have lower doping levels which are 12 and 9, respectively. Without wishing to be bound by theory, it is noticed that the higher the basicity of precursor tertiary amine for the quaternization (shown as greater value of pKa of its conjugated acid), the higher the doping level that the ion-pair polymer can provide. This phenomenon could be due to the difference in interaction strength between corresponding cation-anion ion pair. The QA cation derived from more basic amine precursor possesses stronger ionic interaction with the dihydrogen phosphate anion, which in turn is able to hold more PA molecules via hydrogen bonds. BPN1-TMA and BPN1-Pip exhibited similar doping levels as a result of similar basicity of trimethylamine and piperidine (pKa values of protonated amine form are 10.8 and 11). BPN1-Pyr, however, showed the lowest doping level. Since pyridine is the least basic moiety, the resulting pyridinium-dihydrogen phosphate ion-pair interaction would be the weakest, affording the lowest PA doping level. BPN1-DMIm had an intermediate doping level due to an intermediate basicity of 1,2-dimethylimidazole.

TABLE 1

Phosphoric acid doping level and water uptake.

| Ionomer | $pK_a$ | Doping Level | Water Uptake (%)* |
|---|---|---|---|
| BPN1-TMA | 10.8 | 16 | 12 |
| BPN1-Pip | 11 | 15 | 11 |
| BPN1-DMIm | 8.2 | 12 | 18 |
| BPN1-Pyr | 5.2 | 9 | 6 |

*Weight percent of water compared to dry mass of PA-doped membrane.

Figure 5:
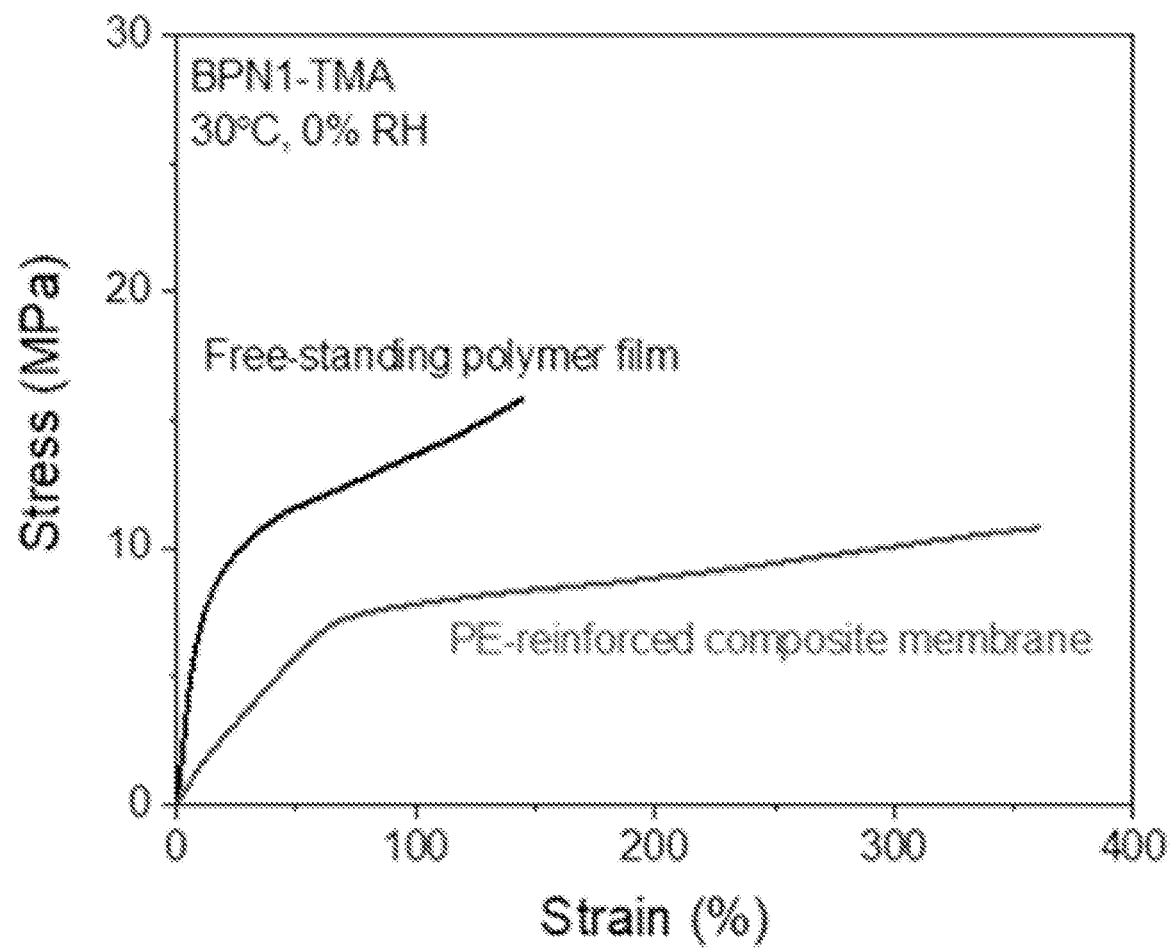
FIG. 5 shows stress-strain curves for ion exchange membrane materials according to some embodiments of the present disclosure.

Referring now to FIG. 5, the mechanical properties of both free-standing polymer films and polyethylene (PE) reinforced composite membranes of PA-doped BPN1-TMA were evaluated at 30° C. and 0% RH. The PE-reinforced composite membrane dramatically outperformed free-standing polymer film in terms of strain. The elongation at break reached 363% for BPN1-TMA composite membrane in contrast to 165% for BPN1-TMA free-standing polymer film.

Figure 6:
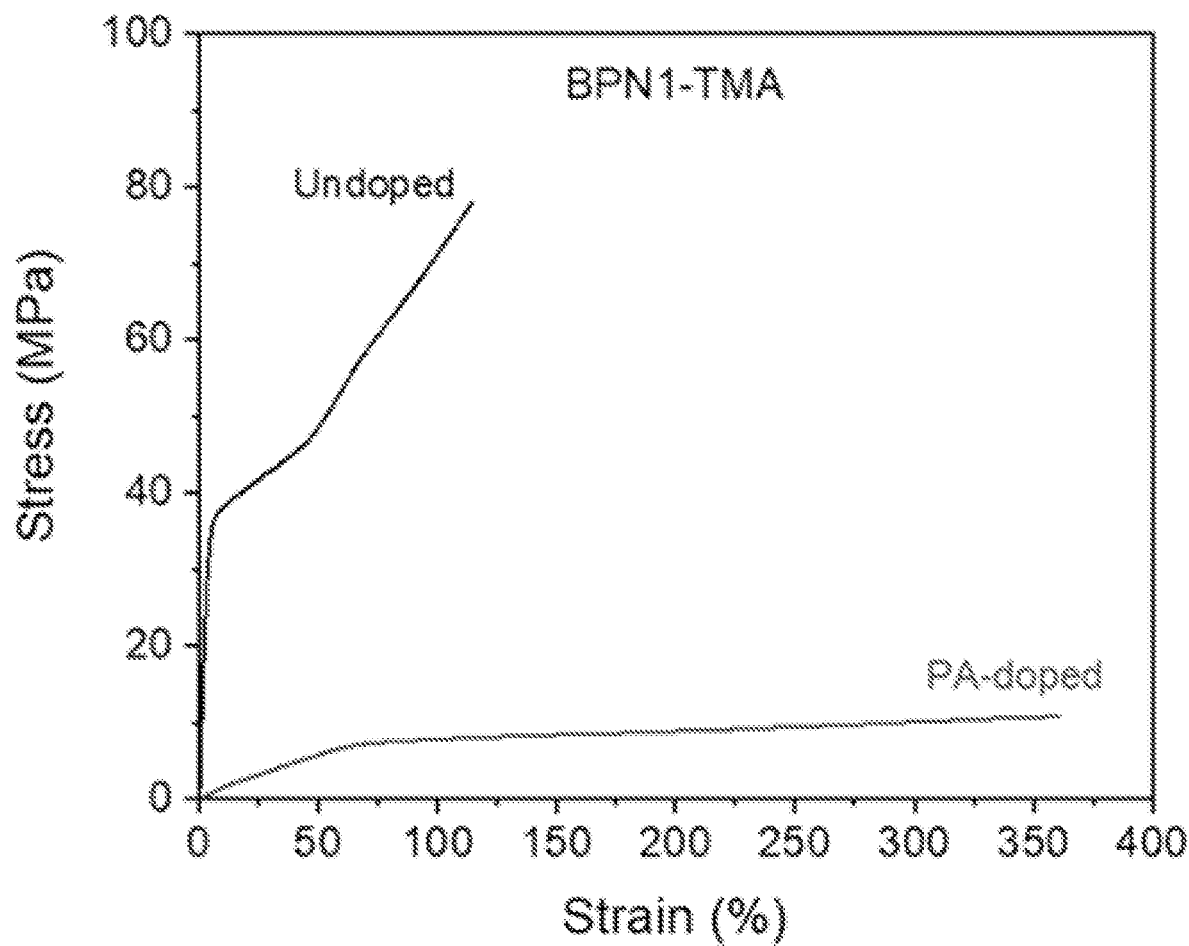
FIG. 6 shows a mechanical property comparison for ion exchange membrane materials according to some embodiments of the present disclosure with a precursor polymeric material.

Referring now to FIG. 6, without wishing to be bound by theory, mechanical properties were found to be strongly related to the PA doping level of each membrane. The doped PA can induce plasticization on the polymer. When comparing the stress-strain curves of BPN1-TMA membranes before and after PA doping, tensile strength decreased from 79 MPa to 11 MPa while elongation at break increased from 116% to 363% upon PA doping. Such observation of reduced tensile strength and increased elongation at break were consistent with when a small molecule induces a plasticization effect. In this case, the doped PA molecules act as a plasticizer, resulting in a more flexible membrane.

Figure 7:
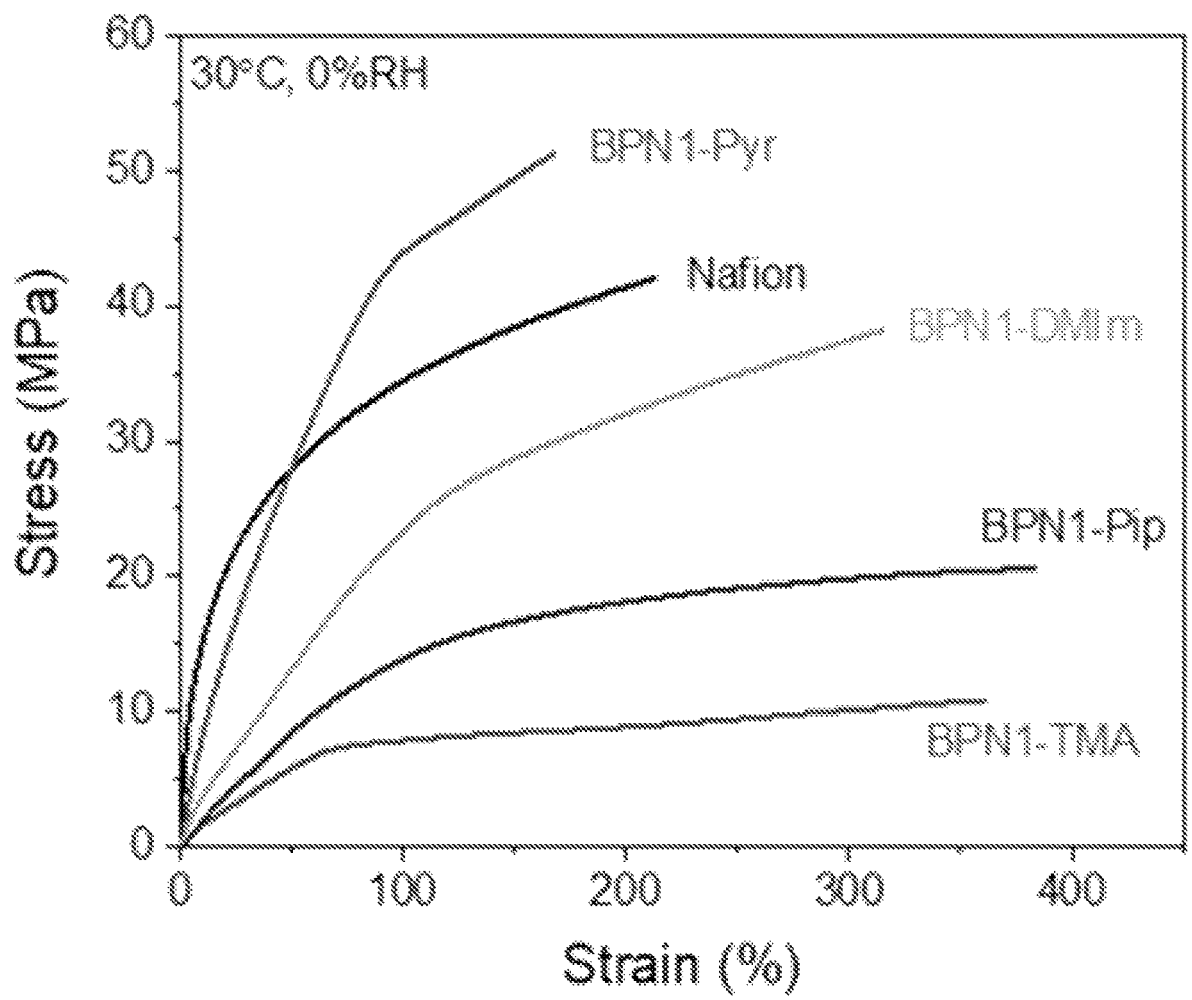
FIG. 7 shows a mechanical property comparison for ion exchange membrane materials according to some embodiments of the present disclosure in comparison with Nafion®.

FIG. 7 shows the mechanical properties of all four PA-doped biphenyl composite PEMs and their comparison to Nafion®. BPN1-TMA and BPN1-Pip, which have higher PA content, exhibited more flexibility than BPN1-Pyr whose PA doping level is relatively low. Since they are synthesized from the same precursor polymer, the molecular weight effect on material's mechanical properties was excluded. Without wishing to be bound by theory, the mechanical property difference was attributed to the difference in plasticization effect. Notably, BPN1-TMA, BPN1-Pip, and BPN1-DMIm exhibit elongation at break as 363%, 385%, and 315%, respectively, which outperform Nafion® whose elongation at break is 216% under the same test conditions. Although doped PA reduced membrane's tensile strength, they are still strong enough to fabricate MEA. For example, BPN1-TMA, BPN1-Pip, and BPN1-DMIm showed tensile strength of 11 MPa, 20 MPa, and 38 MPa, respectively.

Figure 8:
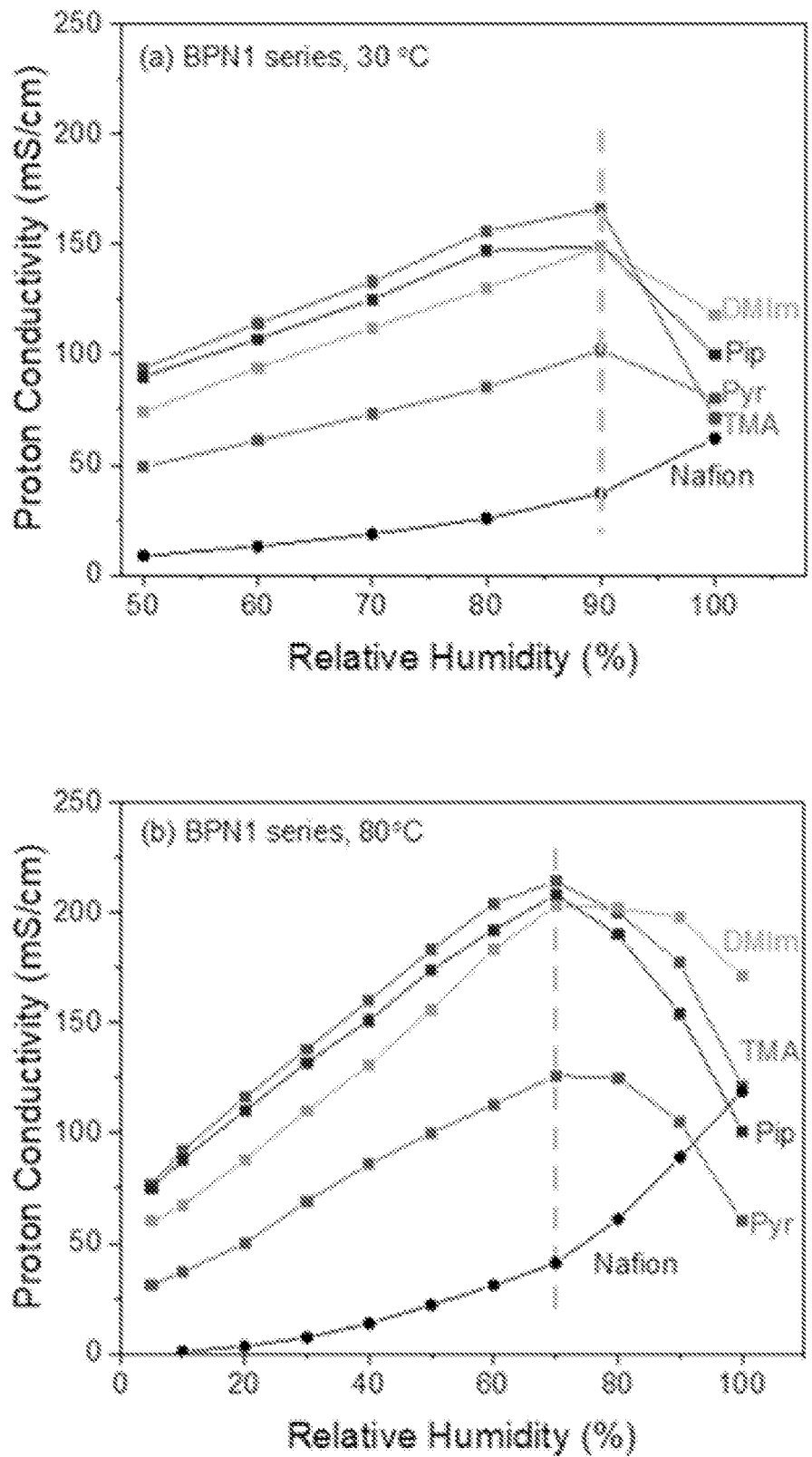
FIG. 8 shows proton conductivity equilibrium for ion exchange membrane materials according to some embodiments of the present disclosure in comparison with Nafion®.

Referring now to FIG. 8, proton conductivity for the example membranes was tested under two conditions: at 30° C. from 50% to 100% RH and at 80° C. from 5% to 100% RH. The membranes were maintained at certain temperature and RH for at least 4 hours to obtain reliable equilibrium conductivity reading. BPN1-TMA, whose PA doping level was highest, showed the highest proton conductivity in general. Moreover, the conductivity at 80° C. was consistently higher than that of 30° C. with the same RH. For example, BPN1-Pip had proton conductivity of 173 mS/cm at 80° C. and 50% RH while it had 89 mS/cm at 30° C. and 50% RH. Nafion® started to show good proton conductivity only when RH was greater than 80%. All PA-doped membranes, however, significantly outperformed Nafion® below 90% RH conditions. For example, BPN1-TMA possessed proton conductivity of 205 mS/cm at 80° C. and 60% RH, while Nafion® only provided 31 mS/cm under the same condition. Although the ion-pair PEMs can conduct proton without humidification, the increasing RH helped enhance proton conductivity until a certain threshold RH. FIG. 7 shows that the threshold point at about 90% RH at 30° C. and 70% RH at 80° C. BPN1-TMA showed the highest proton conductivity as 213 mS/cm at 80° C. and 70% RH, and BPN1-Pip and BPN1-DMIm show 207 mS/cm and 203 mS/cm at the same condition. To further confirm the RH tolerance (90% RH for 30° C. and 70% RH for 80° C.), the measurement time was extended up to 14 h and no obvious conductivity drop was observed for both cases.

Methods and systems of the present disclosure are advantageous in that they provide ion exchange membrane materials exhibiting improved conductivity at reduced relative humidity and elevated temperature compared to commercially available membranes such as those composed of Nafion®. The improved conductivity at low and intermediate RH originates from the reduced dependence of proton conductivity on the presence of water molecules Instead, proton conductivity is provided by phosphoric acid doping, specifically the clustering of phosphoric acid molecules around quaternary ammonium groups of the membrane's polymer network. These membranes exhibit negligible dopant leaching even at high relative humidity, meaning the membranes remain effective across a broad range of operating conditions. Additionally, the membranes maintain excellent mechanical properties, particularly with the addition of polyethylene reinforcing mesh.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. An ion exchange membrane material comprising a polymer comprising a repeating unit according to Formula I:

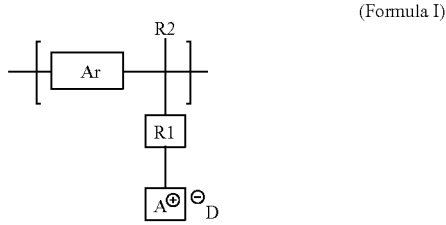

(Formula I)

wherein Ar includes one or more aryl groups, R1 is a saturated or unsaturated hydrocarbon group, a hydrocarbon ring, or a combination thereof,
A is a quaternary ammonium group,
D is an ionic dopant, and R2 is a halocarbon group; and
wherein the ionic dopant includes dihydrogen phosphate anions and phosphoric acid molecules, and wherein the phosphoric acid molecules form a cluster surrounding the quaternary ammonium group, wherein A includes trimethylamine, 1-methylpiperidine, pyridine, 1,2-dimethylimidazole, quinuclidine, pentamethylguanidine, or combinations thereof.

2. The ion exchange membrane material according to claim 1, wherein the one or more aryl groups include:

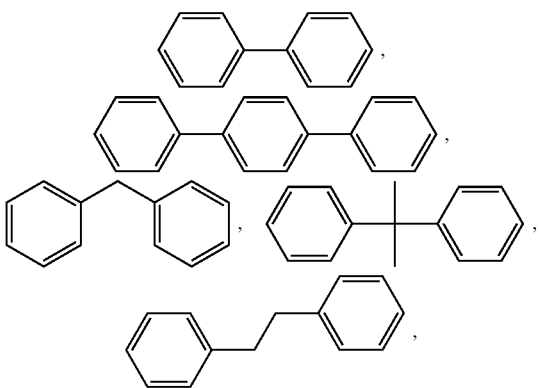

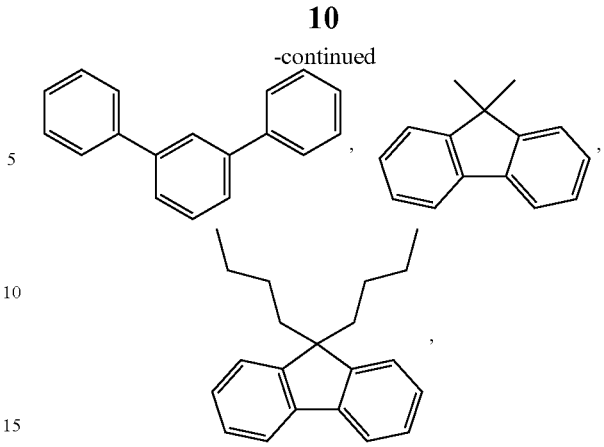

or combinations thereof.

3. The ion exchange membrane material according to claim 1, wherein the number of phosphoric acid molecules per A group is above about 9.

4. The ion exchange membrane material according to claim 3, wherein the number of phosphoric acid molecules per A group is above about 14.

5. The ion exchange membrane material according to claim 1, wherein R2 is $CF_3$.

6. A method of making an ion exchange membrane material, comprising:
providing one or more polymers, the one or more polymers including a plurality of repeating units, wherein the repeating units include:
a backbone including one or more aryl groups;
a halocarbon group attached to the backbone; and
a halocarbon side chain attached to the backbone, wherein the halocarbon side chain includes a halide separated from the backbone by hydrocarbon chain, a hydrocarbon ring, or combinations thereof;
substituting the halide with a tertiary amine to form an amine-substituted polymer and halide anions;
exchanging halide anions with hydroxide anions; and
contacting the amine-substituted polymer and hydroxide anions with phosphoric acid to provide an ionic dopant to the amine-substituted polymer and form quaternary ammonium groups; and wherein the ionic dopant includes dihydrogen phosphate anions and phosphoric acid molecules, and wherein the phosphoric acid molecules form a cluster surrounding the quaternary ammonium groups, wherein A includes trimethylamine, 1-methylpiperidine, pyridine, 1,2-dimethylimidazole, quinuclidine, pentamethylquanidine, or combinations thereof.

7. The method according to claim 6, wherein the one or more polymers are provided as a crosslinked polymer network.

8. The method according to claim 6, wherein the number of phosphoric acid molecules per amine group is above about 9.

9. The method according to claim 8, wherein the number of phosphoric acid molecules per amine group is above about 14.

10. An electrochemical energy conversion system comprising: an anode; a cathode; and
an ion exchange membrane disposed between the anode and the cathode,
wherein the ion-exchange membrane includes a polymer comprising a repeating unit in accordance to Formula I:

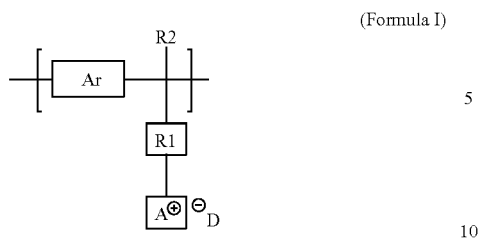

(Formula I)

wherein Ar includes one or more aryl groups, R1 is a saturated or unsaturated hydrocarbon group, a hydrocarbon ring, or a combination thereof, A is a quaternary ammonium group, D is an ionic dopant, and R2 is a halocarbon group; and wherein the ionic dopant includes dihydrogen phosphate anions and phosphoric acid molecules, and wherein the phosphoric acid molecules form a cluster surrounding the quaternary ammonium group, wherein A includes trimethylamine, 1-methylpiperidine, pyridine, 1,2-dimethylimidazole, quinuclidine, pentamethylguanidine, or combinations thereof.

11. The system according to claim 10, wherein the ion exchange membrane is disposed on a reinforcing substrate.

12. The system according to claim 11, wherein the reinforcing substrate includes a polyethylene mesh.

13. The system according to claim 10, wherein the number of dopant molecules per A group is above about 9.

\* \* \* \* \*